United States Patent
Kim et al.

(10) Patent No.: US 10,277,442 B2
(45) Date of Patent: Apr. 30, 2019

(54) DATA TRANSMISSION METHOD AND APPARATUS IN WIRELESS COMMUNICATION SYSTEM

(71) Applicant: LG ELECTRONICS INC., Seoul (KR)

(72) Inventors: Jinmin Kim, Seoul (KR); Wookbong Lee, Seoul (KR); Hangyu Cho, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/556,281

(22) PCT Filed: Oct. 21, 2015

(86) PCT No.: PCT/KR2015/011138
§ 371 (c)(1),
(2) Date: Sep. 6, 2017

(87) PCT Pub. No.: WO2016/143970
PCT Pub. Date: Sep. 15, 2016

(65) Prior Publication Data
US 2018/0048503 A1    Feb. 15, 2018

Related U.S. Application Data

(60) Provisional application No. 62/129,036, filed on Mar. 6, 2015.

(51) Int. Cl.
*H04L 27/26* (2006.01)
*H04W 84/12* (2009.01)
*H04W 88/02* (2009.01)

(52) U.S. Cl.
CPC .......... *H04L 27/26* (2013.01); *H04L 27/2602* (2013.01); *H04L 27/2605* (2013.01);
(Continued)

(58) Field of Classification Search
CPC . H04L 27/26; H04L 27/2602; H04L 27/2605; H04L 27/2613; H04W 84/12; H04W 88/02
See application file for complete search history.

(56) References Cited

U.S. PATENT DOCUMENTS

| 8,867,563 | B1 | 10/2014 | Cho |
| 2012/0135776 | A1 | 5/2012 | Chu et al. |

(Continued)

FOREIGN PATENT DOCUMENTS

| JP | 2006109270 | 4/2006 |
| WO | 2014182065 | 11/2014 |

OTHER PUBLICATIONS

PCT International Application No. PCT/KR2015/011138, International Search Report dated Feb. 11, 2016, 2 pages.

(Continued)

*Primary Examiner* — Ajay Cattungal
(74) *Attorney, Agent, or Firm* — Lee, Hong, Degerman, Kang & Waimey

(57) ABSTRACT

A data transmission method by a station (STA) apparatus of a wireless LAN system is disclosed. A data transmission method by an STA apparatus according to the present invention comprises the steps of: generating a physical protocol data unit (PPDU) including a physical preamble and a data field; determining whether to add a padding symbol to the PPDU; generating and adding the padding symbol to the PPDU if adding the padding symbol is determined; and transmitting the PPDU.

8 Claims, 10 Drawing Sheets

(52) U.S. Cl.
CPC ......... *H04L 27/2613* (2013.01); *H04W 84/12* (2013.01); *H04W 88/02* (2013.01)

(56) References Cited

U.S. PATENT DOCUMENTS

| | | |
|---|---|---|
| 2012/0314636 A1 | 12/2012 | Liu |
| 2013/0044028 A1 | 2/2013 | Lea et al. |
| 2013/0177004 A1 | 7/2013 | Srinivasa et al. |
| 2013/0229996 A1 | 9/2013 | Wang et al. |
| 2015/0009979 A1 | 1/2015 | Noh et al. |
| 2015/0319782 A1* | 11/2015 | Chu ............... H04W 74/08 370/336 |
| 2016/0072654 A1* | 3/2016 | Choi ............... H04L 27/2602 370/329 |
| 2017/0288748 A1* | 10/2017 | Lou ............... H04B 7/0452 |
| 2018/0175955 A1* | 6/2018 | Kitazato ............... H04L 65/607 |

OTHER PUBLICATIONS

European Patent Office Application No. 15884769.9, Search Report dated Oct. 1, 2018, 7 pages.
Japan Patent Office Application No. 2017-545294, Office Action dated Oct. 2, 2018, 2 pages.

* cited by examiner

[FIG. 1]
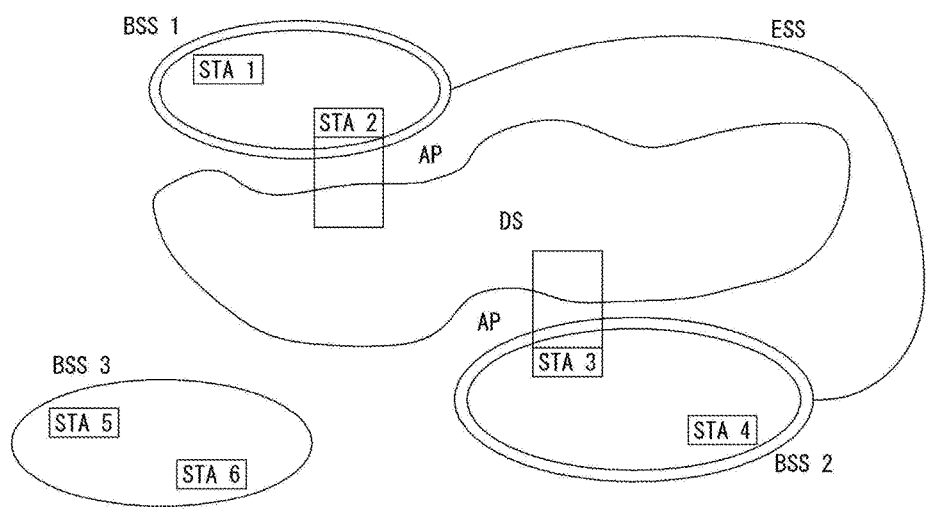
[FIG. 2]
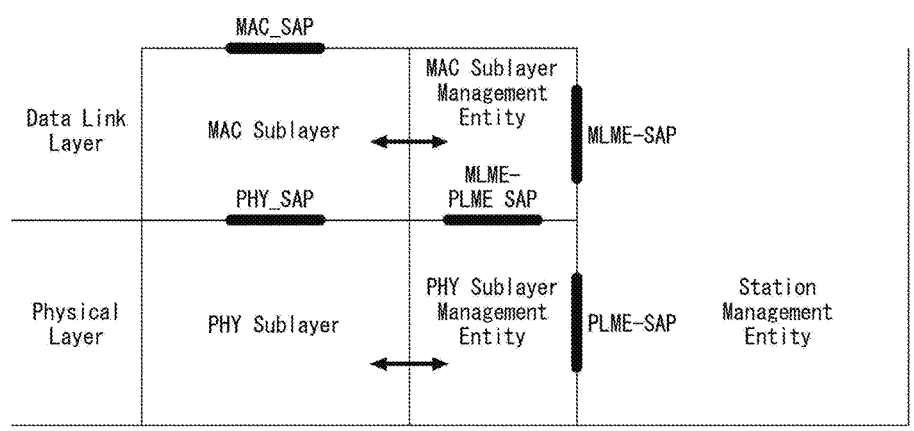

[FIG. 3]
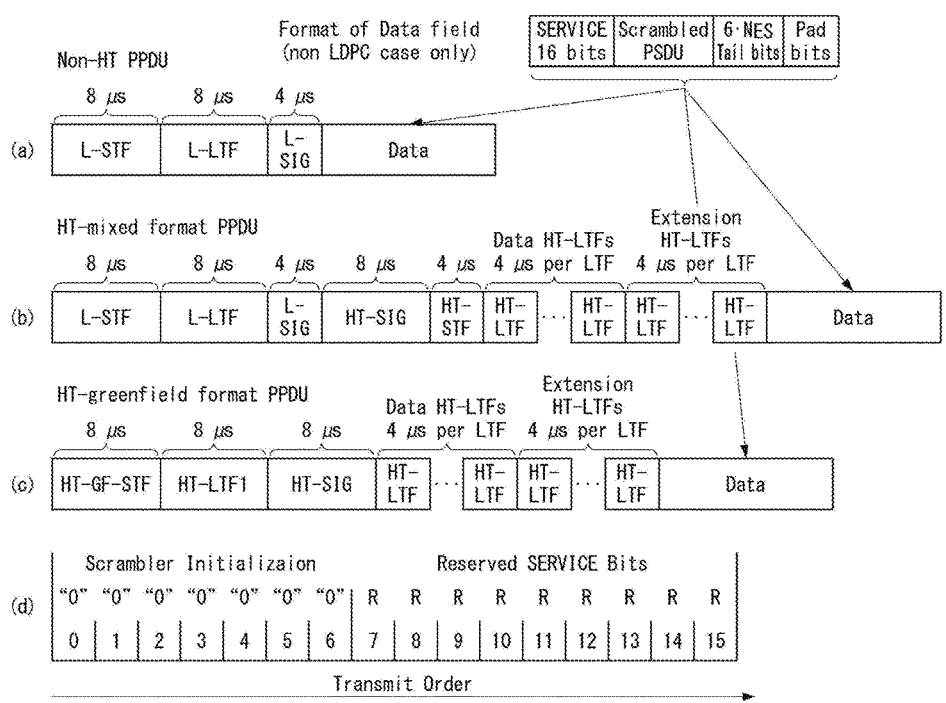

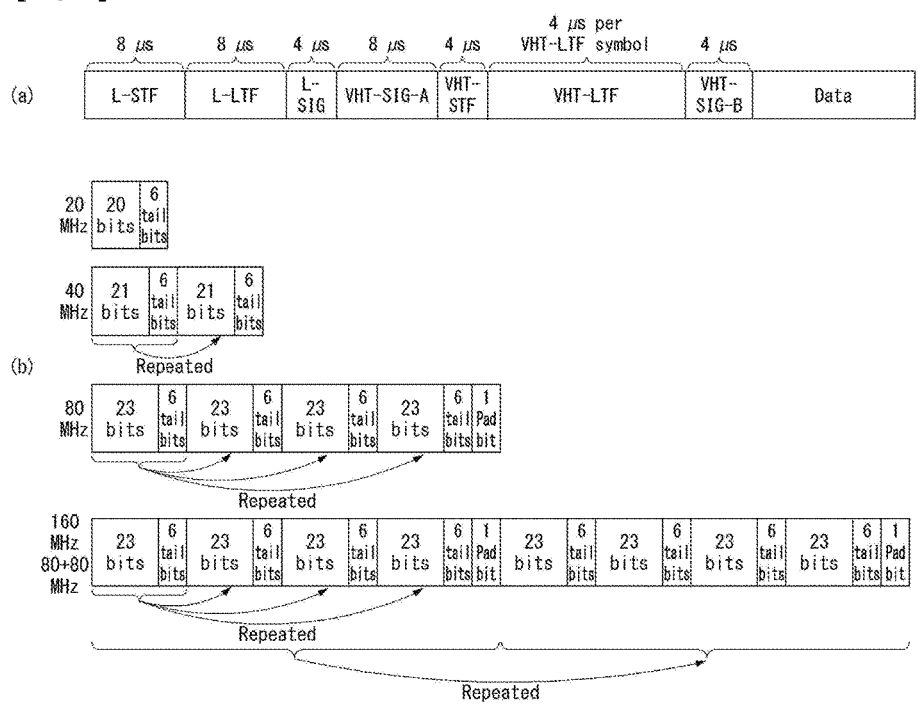
[FIG. 4]

[FIG. 5]
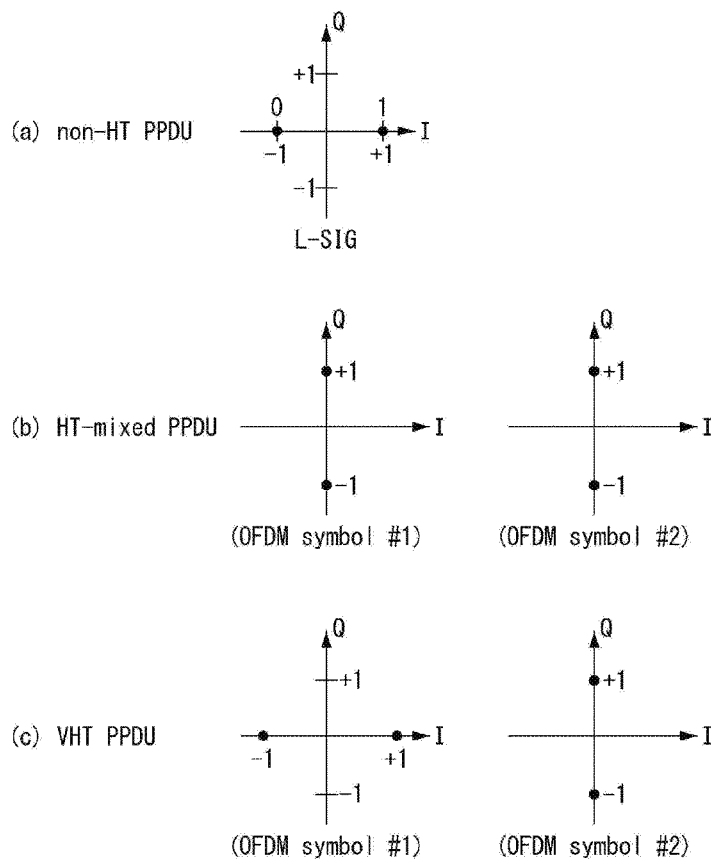
(a) non-HT PPDU — L-SIG
(b) HT-mixed PPDU — (OFDM symbol #1) (OFDM symbol #2)
(c) VHT PPDU — (OFDM symbol #1) (OFDM symbol #2)
[FIG. 6]
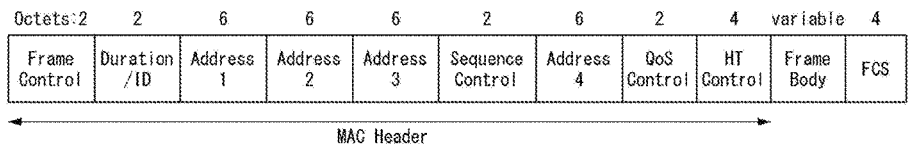

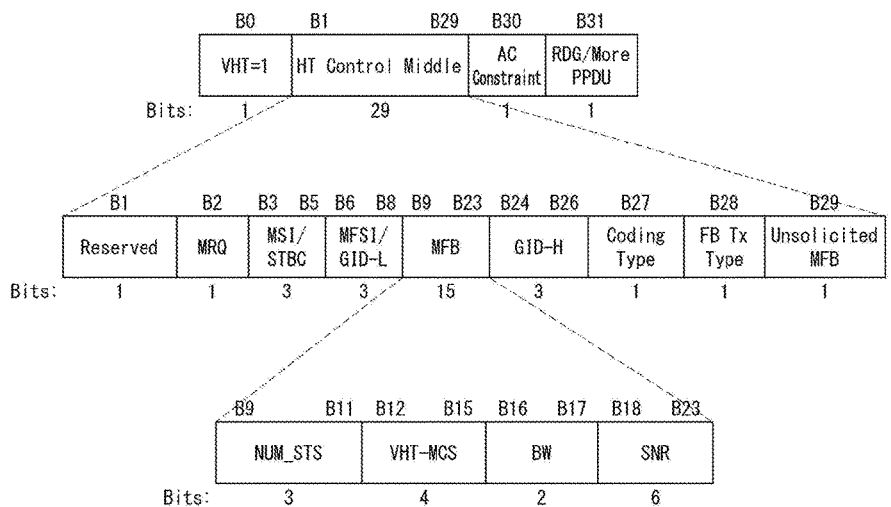

[FIG. 9]
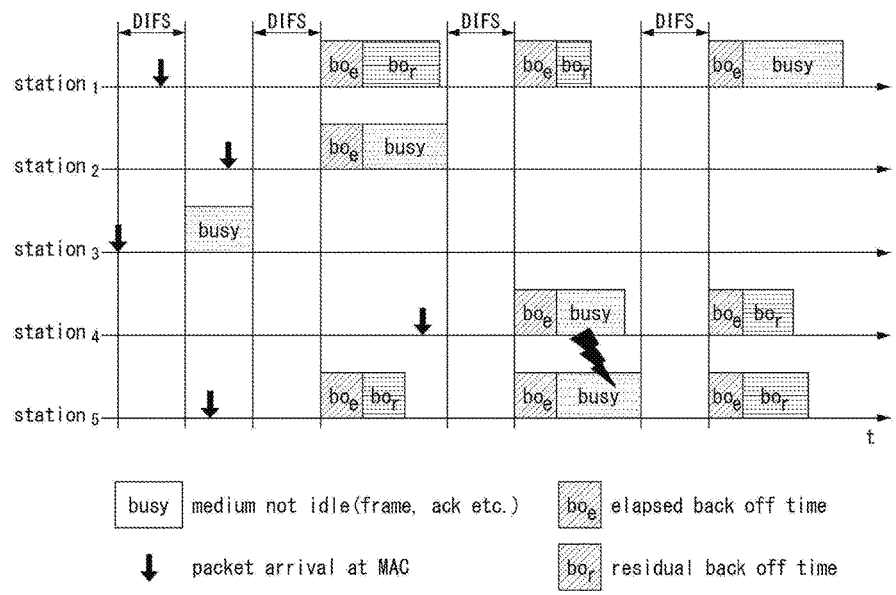
[FIG. 10]
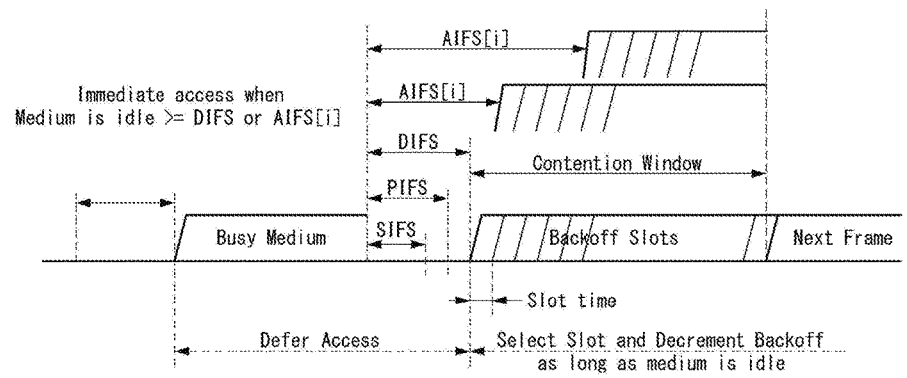

[FIG. 11]
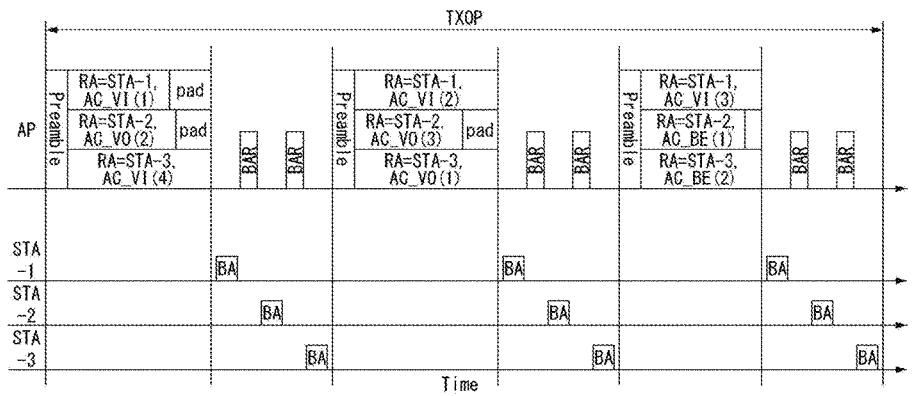
[Figure 12]
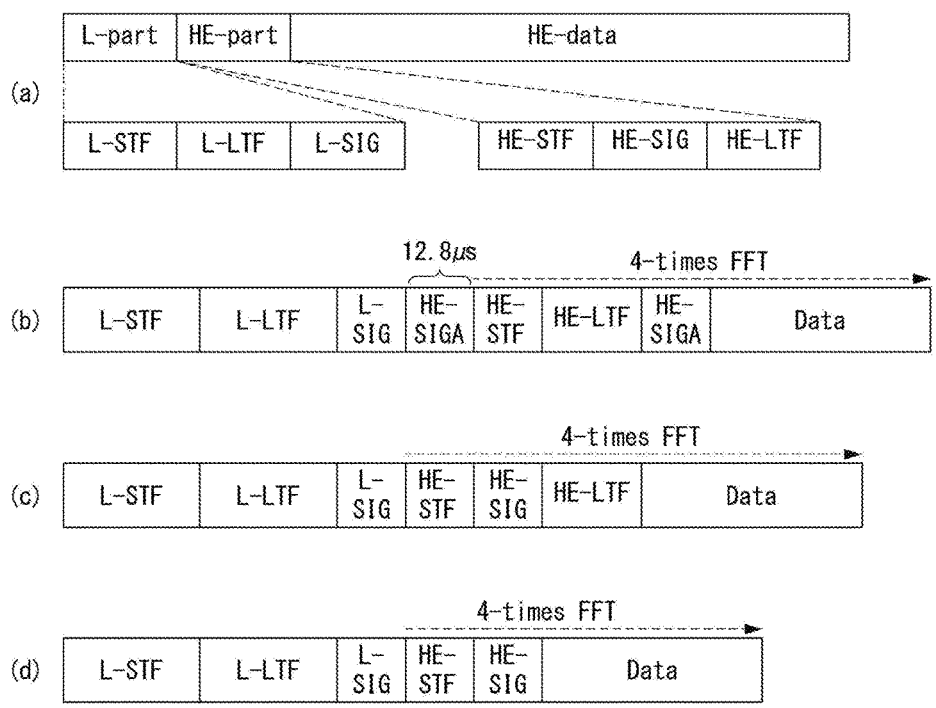

【FIG. 13】

| L-STF | L-LTF | L-SIG | HE-SIG A | HE-SIG B | HE-STF | HE-LTF | Data |
|---|---|---|---|---|---|---|---|
| L-STF | L-LTF | L-SIG | HE-SIG A | | | | |
| L-STF | L-LTF | L-SIG | HE-SIG A | | | | |
| L-STF | L-LTF | L-SIG | HE-SIG A | | | | |

【FIG. 14】

| L-STF | L-LTF | L-SIG | HE-SIG A | HE-SIG B | HE-STF | HE-LTF | Data for STA1 |
|---|---|---|---|---|---|---|---|
| L-STF | L-LTF | L-SIG | HE-SIG A | | HE-STF | HE-LTF | Data for STA2 |
| L-STF | L-LTF | L-SIG | HE-SIG A | | HE-STF | HE-LTF | Data for STA3 |
| L-STF | L-LTF | L-SIG | HE-SIG A | | HE-STF | HE-LTF | Data for STA4 |

【FIG. 15】

| L-STF | L-LTF | L-SIG | HE-SIG A | HE-SIG B | HE-STF | HE-LTF | Data for STA1 |
|---|---|---|---|---|---|---|---|
| L-STF | L-LTF | L-SIG | HE-SIG A | HE-SIG B | HE-STF | HE-LTF | Data for STA2 |
| L-STF | L-LTF | L-SIG | HE-SIG A | HE-SIG B | HE-STF | HE-LTF | Data for STA3 |
| L-STF | L-LTF | L-SIG | HE-SIG A | HE-SIG B | HE-STF | HE-LTF | Data for STA4 |

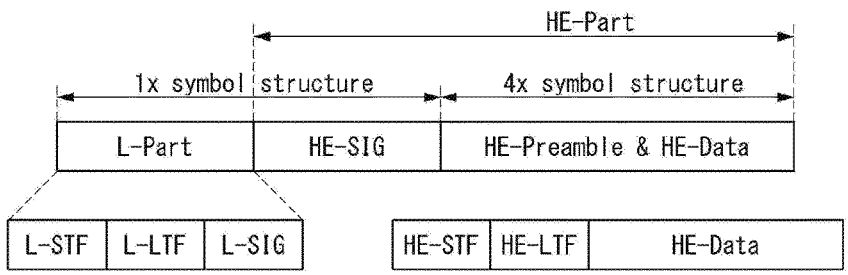

[FIG. 18]
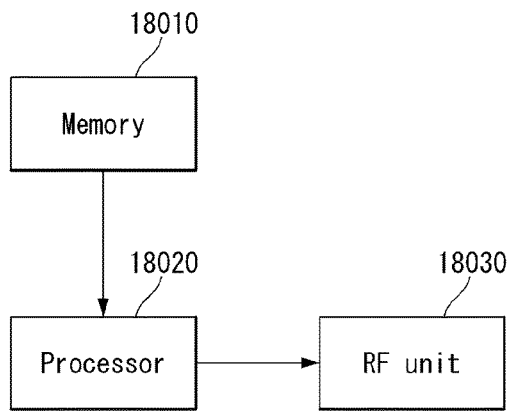
[FIG. 19]
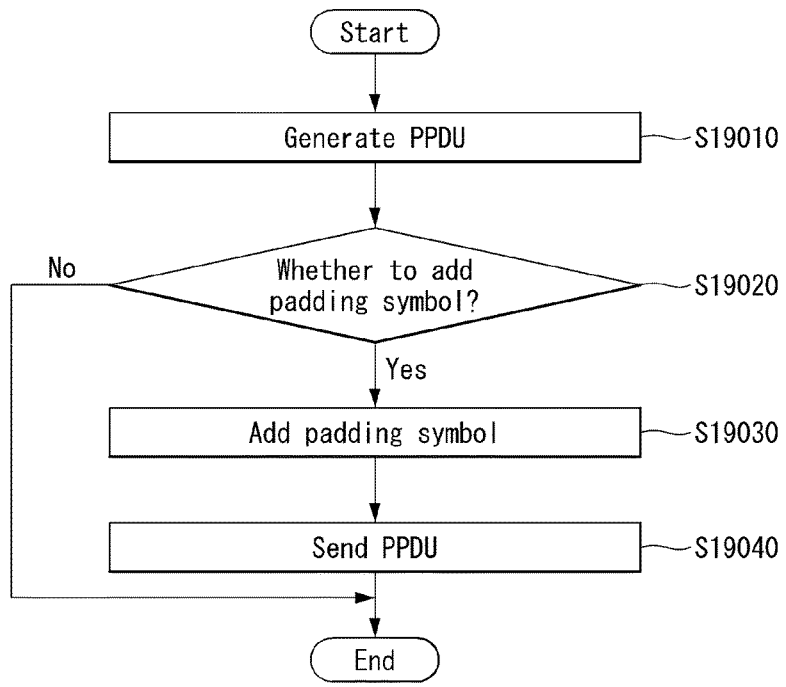

DATA TRANSMISSION METHOD AND APPARATUS IN WIRELESS COMMUNICATION SYSTEM

CROSS-REFERENCE TO RELATED APPLICATIONS

This application is the National Stage filing under 35 U.S.C. 371 of International Application No. PCT/KR2015/011138, filed on Oct. 21, 2015, which claims the benefit of U.S. Provisional Application No. 62/129,036, filed on Mar. 6, 2015, the contents of which are all hereby incorporated by reference herein in their entirety.

TECHNICAL FIELD

The present invention relates to a wireless communication system and, more particularly, to a station (STA) device which adds a padding symbol to a signal and sends the signal so that a receiver can secure a signal processing time according to an increase in the FFT size of transmitted data in a wireless local area network (WLAN) communication system and a method for sending, by the STA, data.

BACKGROUND ART

Wi-Fi is a wireless local area network (WLAN) technology which enables a device to access the Internet in a frequency band of 2.4 GHz, 5 GHz or 6 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 200 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN study group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

DISCLOSURE

Technical Problem

As described above, a method for improving performance in an 802.11ax system, that is, a next-generation wireless LAN system, is being actively discussed. In particular, a method for improving resource utilization efficiency in a limited bandwidth is an important problem in the 802.11ax system.

In the 802.11ax system, for the purpose of average throughput enhancement and robust transmission outdoors, a symbol length four times longer than that in the legacy 802.11 systems (e.g., 802.11a, 802.11n and 802.11ac) is to be used. An STA may adopt an FFT size that is four times great when performing OFDM modulation.

As the FFT size increases, throughput may be improved because the number of subcarriers of a transmission signal is increased compared to the 802.11 legacy system signal, but the time taken to process data may be increased because symbol duration in a receiver is increased. Accordingly, if a predefined SIFS time is used without any change, a reception STA may not send an ACK frame after a determined SIFS time.

Technical Solution

An embodiment of the present invention proposes an STA device in a WLAN system and a method for sending, by the station (STA), data.

A method for sending, by a station (STA), data in a wireless LAN (WLAN) system according to an embodiment of the present invention includes generating a physical protocol data unit (PPDU) including a physical preamble and a data field, the physical preamble including a legacy preamble part and the discrete Fourier transform/inverse discrete Fourier transform (DFT/IDFT) period of the data field being four times the DFT/IDFT period of the legacy preamble part; determining whether or not to add a padding symbol to the PPDU; generating the padding symbol and adding the generated padding symbol to the PPDU if it is determined that the padding symbol is generated; and sending the PPDU.

In the method for sending, by an STA, data according to an embodiment of the present invention, determining whether or not to add the padding symbol to the PPDU may include determining whether or not to add the padding symbol based on at least one of information about the category of a receiving STA, an MCS level of data transmitted in the PPDU, a constellation level and a data rate of the data transmitted in the PPDU.

In the method for sending, by an STA, data according to an embodiment of the present invention, the padding symbol is not decoded in the receiving STA and may correspond to the signal extension of a transmission signal including the transmitted PPDU.

The method for sending, by an STA, data according to an embodiment of the present invention may further include receiving the category information from the receiving STA.

In the method for sending, by an STA, data according to an embodiment of the present invention, the number of added padding symbols may be determined based on the category of the receiving STA.

In the method for sending, by an STA, data according to an embodiment of the present invention, the added padding symbol may be added after forward error correction (FEC) encoding for the data transmitted in the PPDU.

Furthermore, a station (STA) device in a wireless LAN (WLAN) system according to an embodiment of the present invention includes a radio frequency (RF) unit configured to send and receive radio signals and a processor configured to control the RF unit, wherein the processor generates a physical protocol data unit (PPDU) including a physical preamble and a data field, the physical preamble including a legacy preamble part and a discrete Fourier transform/inverse discrete Fourier transform (DFT/IDFT) period of the data field being four times the DFT/IDFT period of the legacy preamble part, determines whether or not to add a padding symbol to the PPDU, generates the padding symbol if it is determined that the padding symbol is generated, adds the generated padding symbol to the PPDU, and sends the PPDU.

In the STA according to an embodiment of the present invention, determining whether or not to add the padding symbol to the PPDU may be performed based on at least one of information about the category of a receiving STA, an MCS level of data transmitted in the PPDU, a constellation level and a data rate of the data transmitted in the PPDU.

In the STA according to an embodiment of the present invention, the padding symbol, the padding symbol is not decoded in the receiving STA and may correspond to a signal extension of a transmission signal including the transmitted PPDU.

In the STA according to an embodiment of the present invention, the STA device may receive the category information from the receiving STA.

In the STA according to an embodiment of the present invention, the number of added padding symbols may be determined based on the category of the receiving STA.

In the STA according to an embodiment of the present invention, the added padding symbol may be added after forward error correction (FEC) encoding for the data transmitted in the PPDU.

Advantageous Effects

In accordance with an embodiment of the present invention, the shortage problem of an SIFS time attributable to an increase in the FFT size because a receiver secures a data decoding time due to the addition of a dummy symbol can be solved. Furthermore, compatibility with existing systems can also be improved because a legacy transmission/reception procedure dependent on the SIFS can also be applied to the 11ac system.

In an embodiment of the present invention, a padding symbol is added by taking into consideration an MCS level or data rate of transmission data and the performance of a receiver. Furthermore, in an embodiment of the present invention, whether the number of added padding symbols can be determined based on performance of a receiver. Accordingly, an overload of redundancy attributable to the addition of an added padding symbol can be minimized.

In accordance with an embodiment of the present invention, a burden of the implementation of a receiver according to the use of a 4×FFT size in the 802.11ax system can be reduced.

DESCRIPTION OF DRAWINGS

FIG. 1 is a diagram showing an example of an IEEE 802.11 system to which an embodiment of the present invention may be applied.

FIG. 2 is a diagram illustrating the structure of layer architecture in an IEEE 802.11 system to which an embodiment of the present invention may be applied.

FIG. 3 illustrates a non-HT format PPDU and HT format PPDU in a wireless communication system to which an embodiment of the present invention may be applied.

FIG. 4 illustrates a VHT format PPDU format in a wireless communication system to which an embodiment of the present invention may be applied.

FIG. 5 is a diagram illustrating a constellation for classifying the formats of PPDUs in a wireless communication system to which an embodiment of the present invention may be applied.

FIG. 6 illustrates the format of a MAC frame of an IEEE 802.11 system to which an embodiment of the present invention may be applied.

FIG. 7 is a diagram illustrating a frame control field within a MAC frame in a wireless communication system to which an embodiment of the present invention may be applied.

FIG. 8 illustrates a VHT format of an HT control field in a wireless communication system to which an embodiment of the present invention may be applied.

FIG. 9 is a diagram for illustrating a random backoff period and a frame transmission procedure in a wireless communication system to which an embodiment of the present invention may be applied.

FIG. 10 is a diagram illustrating an IFS relation in a wireless communication system to which an embodiment of the present invention may be applied.

FIG. 11 is a diagram illustrating a DL MU-MIMO transmission process in a wireless communication system to which an embodiment of the present invention may be applied.

FIG. 12 is a diagram illustrating a high efficiency (HE) format PPDU according to an embodiment of the present invention.

FIG. 13 is a diagram illustrating a HE format PPDU according to an embodiment of the present invention.

FIG. 14 is a diagram illustrating a HE format PPDU according to an embodiment of the present invention.

FIG. 15 is a diagram illustrating a HE format PPDU according to an embodiment of the present invention.

FIG. 16 is a diagram illustrating a HE frame structure according to an embodiment of the present invention.

FIG. 17 shows VHT capabilities elements according to an embodiment of the present invention.

FIG. 18 shows an STA device according to an embodiment of the present invention.

FIG. 19 shows a method for sending, by a station (STA), data according to an embodiment of the present invention.

BEST MODE FOR INVENTION

Hereinafter, some embodiments of the present invention are described in detail with reference to the accompanying drawings. The detailed description to be disclosed herein along with the accompanying drawings is provided to describe exemplary embodiments of the present invention and is not intended to describe a sole embodiment in which the present invention may be implemented. The following detailed description includes detailed contents in order to provide complete understanding of the present invention. However, those skilled in the art will appreciate that the present invention may be implemented even without such detailed contents.

In some cases, in order to avoid making the concept of the present invention vague, the known structure and/or device may be omitted or may be illustrated in the form of a block diagram based on the core function of each structure and/or device.

Furthermore, specific terms used in the following description are provided to help understanding of the present invention, and such specific terms may be changed into other forms without departing from the technological spirit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.20 (WiMAX), IEEE 802.20, or evolved UTRA (E-UTRA). UTRA is part of a universal mobile telecommunications system (UMTS). $3^{rd}$ generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance. In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

FIG. 2 is a diagram illustrating the configuration of layer architecture of an IEEE 802.11 system to which an embodiment of the present invention may be applied.

Referring to FIG. 2, the layer architecture of the IEEE 802.11 system may include a MAC sublayer and a PHY sublayer.

The PHY sublayer may be divided into a physical layer convergence procedure (PLCP) entity and a physical medium dependent (PMD) entity. In this case, the PLCP entity functions to connect the MAC sublayer and a data frame, and the PMD entity functions to wirelessly transmit and receive data to and from two or more STAs.

The MAC sublayer and the PHY sublayer may include respective management entities, which may be referred to as a MAC sublayer management entity (MLME) and a PHY sublayer management entity (PLME), respectively. The management entities provide a layer management service interface through the operation of a layer management function. The MLME is connected to the PLME and may perform the management operation of the MAC sublayer. Likewise, the PLME is also connected to the MLME and may perform the management operation of the PHY sublayer.

In order to provide a precise MAC operation, a station management entity (SME) may be present in each STA. The SME is a management entity independent of each layer, and collects layer-based state information from the MLME and the PLME or sets the values of layer-specific parameters. The SME may perform such a function instead of common system management entities and may implement a standard management protocol.

The MLME, the PLME, and the SME may interact with each other using various methods based on primitives. More specifically, an XX-GET.request primitive is used to request the value of a management information base (MIB) attribute. An XX-GET.confirm primitive returns the value of a corresponding MIB attribute if the state is "SUCCESS", and indicates an error in the state field and returns the value in other cases. An XX-SET.request primitive is used to make a request so that a designated MIB attribute is set as a given value. If an MIB attribute means a specific operation, such a request requests the execution of the specific operation. Furthermore, an XX-SET.confirm primitive means that a designated MIB attribute has been set as a requested value if the state is "SUCCESS." In other cases, the XX-SET.confirm primitive indicates that the state field is an error situation. If an MIB attribute means a specific operation, the primitive may confirm that a corresponding operation has been performed.

An operation in each sublayer is described in brief as follows.

The MAC sublayer generates one or more MAC protocol data units (MPDUs) by attaching a MAC header and a frame check sequence (FCS) to a MAC service data unit (MSDU) received from a higher layer (e.g., an LLC layer) or the fragment of the MSDU. The generated MPDU is delivered to the PHY sublayer.

If an aggregated MSDU (A-MSDU) scheme is used, a plurality of MSDUs may be aggregated into a single aggregated MSDU (A-MSDU). The MSDU aggregation operation may be performed in a MAC higher layer. The A-MSDU is delivered to the PHY sublayer as a single MPDU (if it is not fragmented).

The PHY sublayer generates a physical protocol data unit (PPDU) by attaching an additional field, including information for a PHY transceiver, to a physical service data unit (PSDU) received from the MAC sublayer. The PPDU is transmitted through a wireless medium.

The PSDU has been received by the PHY sublayer from the MAC sublayer, and the MPDU has been transmitted from the MAC sublayer to the PHY sublayer. Accordingly, the PSDU is substantially the same as the MPDU.

If an aggregated MPDU (A-MPDU) scheme is used, a plurality of MPDUs (in this case, each MPDU may carry an A-MSDU) may be aggregated in a single A-MPDU. The MPDU aggregation operation may be performed in a MAC lower layer. The A-MPDU may include an aggregation of various types of MPDUs (e.g., QoS data, acknowledge (ACK), and a block ACK (BlockAck)). The PHY sublayer receives an A-MPDU, that is, a single PSDU, from the MAC sublayer. That is, the PSDU includes a plurality of MPDUs. Accordingly, the A-MPDU is transmitted through a wireless medium within a single PPDU.

Physical Protocol Data Unit (PPDU) Format

A PPDU means a data block generated in the physical layer. A PPDU format is described below based on an IEEE 802.11 a WLAN system to which an embodiment of the present invention may be applied.

FIG. 3 illustrating a non-HT format PPDU and an HT format PPDU in a wireless communication system to which an embodiment of the present invention may be applied.

FIG. 3(a) illustrates a non-HT format PPDU for supporting IEEE 802.11a/g systems. The non-HT PPDU may also be called a legacy PPDU.

Referring to FIG. 3(a), the non-HT format PPDU includes a legacy format preamble, including a legacy (or non-HT) short training field (L-STF), a legacy (or non-HT) long training field (L-LTF), and a legacy (or non-HT) signal (L-SIG) field, and a data field.

The L-STF may include a short training orthogonal frequency division multiplexing symbol (OFDM). The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to send control information for the demodulation and decoding of the data field.

The L-SIG field may include a rate field of four bits, a reserved field of 1 bit, a length field of 12 bits, a parity bit of 1 bit, and a signal tail field of 6 bits.

The rate field includes transfer rate information, and the length field indicates the number of octets of a PSDU.

FIG. 3(b) illustrates an HT mixed format PPDU for supporting both an IEEE 802.11n system and IEEE 802.11a/g system.

Referring to FIG. 3(b), the HT mixed format PPDU includes a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF may include a data HT-LTF used for channel estimation for a spatial stream and an extension HT-LTF additionally used for full channel sounding. Accordingly, a plurality of HT-LTFs may be the same as or greater than number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

An L-STF, an L-LTF, L-SIG, and HT-SIG fields are transmitted without performing beamforming up to an HT-SIG field so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into considerate a portion whose power is varied by precoding, and a plurality of HT-LTFs and a data field are subsequently transmitted.

FIG. 3(c) illustrates an HT-green field format PPDU (HT-GF format PPDU) for supporting only an IEEE 802.11n system.

Referring to FIG. 3(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

In FIGS. 3(a) to 3(c), the data field is a payload and may include a service field, a scrambled PSDU (PSDU) field, tail bits, and padding bits. All of the bits of the data field are scrambled.

FIG. 3(d) illustrates a service field included in the data field. The service field has 20 bits. The 20 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio channel. In accordance with the MU-MIMO transmission method, an AP may simultaneously transmit a packet to one or more STAs that have been subjected to MIMO pairing.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology. Furthermore, an SU PPDU means a PPDU having a format in which only one PSDU can be delivered or which does not have a PSDU.

For MU-MIMO transmission, the size of control information transmitted to an STA may be relatively larger than size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

FIG. 4 illustrates a VHT format PPDU in a wireless communication system to which an embodiment of the present invention may be applied.

FIG. 4(a) illustrates a VHT format PPDU for supporting an IEEE 802.11ac system.

Referring to FIG. 4(a), the VHT format PPDU includes a legacy format preamble including an L-STF, an L-LTF, and an L-SIG field, a VHT format preamble including a VHT-signal-A (VHT-SIG-A) field, a VHT short training field (VHT-STF), a VHT long training field (VHT-LTF), and a VHT-signal-B (VHT-SIG-B) field, and a data field.

The L-STF, the L-LTF, and the L-SIG field mean legacy fields for backward compatibility and have the same formats as those of the non-HT format. In this case, the L-LTF may further include information for channel estimation which will be performed in order to demodulate the L-SIG field and the VHT-SIG-A field.

The L-STF, the L-LTF, the L-SIG field, and the VHT-SIG-A field may be repeated in a 20 MHz channel unit and transmitted. For example, when a PPDU is transmitted through four 20 MHz channels (i.e., an 80 MHz bandwidth), the L-STF, the L-LTF, the L-SIG field, and the VHT-SIG-A field may be repeated every 20 MHz channel and transmitted.

A VHT-STA may be aware of the VHT format PPDU using the VHT-SIG-A field subsequent to the legacy fields, and may decode the data field based on the VHT-SIG-A field.

In the VHT format PPDU, the L-STF, the L-LTF, and the L-SIG field are first transmitted so that even an L-STA can receive the VHT format PPDU and obtain data. Thereafter, the VHT-SIG-A field is transmitted for the demodulation and decoding of data transmitted for a VHT-STA.

The VHT-SIG-A field is a field for the transmission of control information that is common to a VHT STAB that are MIMO-paired with an AP, and includes control information for interpreting the received VHT format PPDU.

The VHT-SIG-A field may include a VHT-SIG-A1 field and a VHT-SIG-A2 field.

The VHT-SIG-A1 field may include information about a channel bandwidth (BW) used, information about whether space time block coding (STBC) is applied or not, a group identifier (ID) for indicating a group of grouped STAs in MU-MIMO, information about the number of streams used (the number of space-time streams (NSTS)/part association identifier (AID), and transmit power save forbidden information. In this case, the group ID means an identifier assigned to a target transmitting STA group in order to support MU-MIMO transmission, and may indicate whether the present MIMO transmission method is MU-MIMO or SU-MIMO.

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

The VHT-STF is used to improve AGC estimation performance in MIMO transmission.

The VHT-LTF is used for a VHT-STA to estimate an MIMO channel. Since a VHT WLAN system supports MU-MIMO, the VHT-LTF may be configured by the number of spatial streams through which a PPDU is transmitted. Additionally, if full channel sounding is supported, the number of VHT-LTFs may be increased.

The VHT-SIG-B field includes dedicated control information which is necessary for a plurality of MU-MIMO-paired VHT-STAs to receive a PPDU and to obtain data. Accordingly, only when common control information included in the VHT-SIG-A field indicates that a received PPDU is for MU-MIMO transmission, a VHT-STA may be designed to decode the VHT-SIG-B field. In contrast, if common control information indicates that a received PPDU is for a single VHT-STA (including SU-MIMO), an STA may be designed to not decode the VHT-SIG-B field.

The VHT-SIG-B field includes a VHT-SIG-B length field, a VHT-MCS field, a reserved field, and a tail field.

The VHT-SIG-B length field indicates the length of an A-MPDU (prior to end-of-frame (EOF) padding). The VHT-MCS field includes information about the modulation, encoding, and rate-matching of each VHT-STA.

The size of the VHT-SIG-B field may be different depending on the type (MU-MIMO or SU-MIMO) of MIMO transmission and a channel bandwidth used for PPDU transmission.

FIG. 4(b) illustrates a VHT-SIG-B field according to a PPDU transmission bandwidth.

Referring to FIG. 4(b), in 40 MHz transmission, VHT-SIG-B bits are repeated twice. In 80 MHz transmission, VHT-SIG-B bits are repeated four times, and padding bits set to 0 are attached.

In 200 MHz transmission and 80+80 MHz transmission, first, VHT-SIG-B bits are repeated four times as in the 80 MHz transmission, and padding bits set to 0 are attached. Furthermore, a total of the 117 bits is repeated again.

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because a MAC protocol data unit (MPDU) and/or an aggregate MAC PDU (A-MPDU) are set based on the bytes (or octets) of the MAC layer.

In FIG. 4, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

This is described in more detail below with reference to the following drawings.

FIG. 5 is a diagram illustrating constellations for classifying the formats of PPDUs in a wireless communication system to which an embodiment of the present invention may be applied.

FIG. 5(a) illustrates the constellation of an L-SIG field included in a non-HT format PPDU, FIG. 5(b) illustrates a phase rotation for HT mixed format PPDU detection, and FIG. 5(c) illustrates a phase rotation for VHT format PPDU detection.

In order to classify a non-HT format PPDU, an HT-GF format PPDU, an HT mixed format PPDU, and a VHT format PPDU, an STA uses an L-SIG field and the phase of the constellation of OFDM symbols transmitted after the L-SIG field. That is, the STA may determine a PPDU format based on the L-SIG field of the received PPDU and/or the phase of the constellation of OFDM symbols transmitted after the L-SIG field.

Referring to FIG. 5(a), binary phase shift keying (BPSK) is used as OFDM symbols forming an L-SIG field.

First, in order to determine an HT-GF format PPDU, an STA determines whether a detected SIG field is an L-SIG field when the first SIG field is detected in a received PPDU. That is, the STA attempts decoding based on a constellation, such as the example of FIG. 5(a). When the decoding fails, the STA may determine a corresponding PPDU to be not an HT-GF format PPDU.

Next, in order to determine a non-HT format PPDU, an HT mixed format PPDU, and a VHT format PPDU, the phase of the constellation of OFDM symbols transmitted after the L-SIG field may be used. That is, a method for modulating the OFDM symbols transmitted after the L-SIG field may be different. An STA may determine a PPDU format based on a modulation method for a field after the L-SIG field of the received PPDU.

Referring to FIG. 5(b), in order to determine an HT mixed format PPDU, the phases of two OFDM symbols transmitted after the L-SIG field in the HT mixed format PPDU may be used.

More specifically, the phases of an OFDM symbol #1 and OFDM symbol #2 corresponding to an HT-SIG field transmitted after the L-SIG field in the HT mixed format PPDU are counterclockwise rotated 90 degrees. That is, quadrature binary phase shift keying (QBPSK) is used as a method for modulating the OFDM symbol #1 and the OFDM symbol #2. A QBPSK constellation may be a constellation whose phase has been counterclockwise rotated 90 degrees based on a BPSK constellation.

An STA attempts decoding for a first OFDM symbol and second OFDM symbol corresponding to an HT-SIG-A field transmitted after the L-SIG field of the received PPDU based on a constellation, such as the example of FIG. 5(b). If the decoding is successful, the STA determines that the corresponding PPDU is an HT format PPDU.

Next, in order to determine a non-HT format PPDU and a VHT format PPDU, the phase of the constellation of OFDM symbols transmitted after the L-SIG field may be used.

Referring to FIG. 5(c), in order to determine a VHT format PPDU, the phases of two OFDM symbols transmitted after the L-SIG field in the VHT format PPDU may be used.

More specifically, the phase of an OFDM symbol #1 corresponding to a VHT-SIG-A field after the L-SIG field in the VHT format PPDU is not rotated, but the phase of an OFDM symbol #2 is counterclockwise rotated 90 degrees. That is, BPSK is used as a modulation method for the OFDM symbol #1, and QBPSK is used as a modulation method for the OFDM symbol #2.

An STA attempts decoding for the first OFDM symbol and second OFDM symbol corresponding to the VHT-SIG field transmitted after the L-SIG field of the received PPDU based on a constellation, such as the example of FIG. 5(c). If the decoding is successful, the STA may determine that the corresponding PPDU is a VHT format PPDU.

In contrast, if the decoding fails, the STA may determine the corresponding PPDU is a non-HT format PPDU.

MAC Frame Format

FIG. 6 illustrates the format of a MAC frame for an IEEE 802.11 system to which an embodiment of the present invention may be applied.

Referring to FIG. 6, the MAC frame (i.e., an MPDU) includes a MAC header, a frame body, and a frame check sequence (FCS).

The MAC Header is defined as an area, including a Frame Control field, a Duration/ID field, an Address 1 field, an Address 2 field, an Address 3 field, a Sequence Control field, an Address 4 field, a QoS Control field, and an HT Control field.

The Frame Control field includes information about the characteristics of a corresponding MAC frame. The Frame Control field is described in detail later.

The Duration/ID field may be implemented to have a different value depending on the type and subtype of a corresponding MAC frame.

If the type and subtype of a corresponding MAC frame is a PS-poll frame for a power save (PS) operation, the Duration/ID field may be configured to include the association identifier (AID) of an STA that has transmitted the frame. In the remaining cases, the Duration/ID field may be configured to have a specific duration value depending on the type and subtype of a corresponding MAC frame. Furthermore, if a frame is an MPDU included in an aggregate-MPDU (A-MPDU) format, the Duration/ID field included in a MAC header may be configured to have the same value.

The Address 1 field to the Address 4 field are used to indicate a BSSID, a source address (SA), a destination address (DA), a transmitting address (TA) indicating the address of a transmitting STA, and a receiving address (RA) indicating the address of a receiving STA.

An Address field implemented as a TA field may be set as a bandwidth signaling TA value. In this case, the TA field may indicate that a corresponding MAC frame includes additional information in a scrambling sequence. The bandwidth signaling TA may be represented as the MAC address of an STA that sends a corresponding MAC frame, but individual/group bits included in the MAC address may be set as a specific value (e.g., "1").

The Sequence Control field includes a sequence number and a fragment number. The sequence number may indicate a sequence number assigned to a corresponding MAC frame. The fragment number may indicate the number of each fragment of a corresponding MAC frame.

The QoS Control field includes information related to QoS. The QoS Control field may be included if it indicates a QoS Data frame in a subtype subfield.

The HT Control field includes control information related to an HT and/or VHT transmission/reception scheme. The HT Control field is included in a control wrapper frame. Furthermore, the HT Control field is present in a QoS Data frame having an order subfield value of 1 and a management frame.

The frame body is defined as a MAC payload. Data to be transmitted in a higher layer is placed in the frame body. The frame body has a varying size. For example, a maximum size of an MPDU may be 11454 octets, and a maximum size of a PPDU may be 5.484 ms.

The FCS is defined as a MAC footer and used for the error search of a MAC frame.

The first three fields (i.e., the Frame Control field, the Duration/ID field, and Address 1 field) and the Last field (i.e., the FCS field) form a minimum frame format and are present in all of frames. The remaining fields may be present only in a specific frame type.

FIG. 7 is a diagram illustrating a Frame Control field within the MAC frame in a wireless communication system to which an embodiment of the present invention may be applied.

Referring to FIG. 7, the Frame Control field includes a Protocol Version subfield, a Type subfield, a Subtype subfield, a To DS subfield, a From DS subfield, a More Fragments subfield, a Retry subfield, a Power Management subfield, a More Data subfield, a Protected Frame subfield, and an Order subfield.

The Protocol Version subfield may indicate the version of a WLAN protocol applied to a corresponding MAC frame.

The Type subfield and the Subtype subfield may be set to indicate information that identifies the function of a corresponding MAC frame.

The type of MAC frame may include the three types of management frames, control frames, and data frames.

Furthermore, each of the frame types may be divided into subtypes.

For example, the control frames may include request to send (RTS) frame, a clear-to-send (CTS) frame, an acknowledgment (ACK) frame, a PS-poll frame, a contention free (CF)-end frame, a CF-End+CF-ACK frame, a block ACK request (BAR) frame, a block ACK (BA) frame, a control wrapper (Control+HTcontrol)) frame, a VHT null data packet announcement (NDPA), and a beamforming report poll frame.

The management frames may include a beacon frame, an announcement traffic indication message (ATIM) frame, a disassociation frame, an association request/response frame, a reassociation request/response frame, a probe request/response frame, an authentication frame, a deauthentication frame, an action frame, an action no ACK frame, and a timing advertisement frame.

The To DS subfield and the From DS subfield may include information that is necessary to analyze an Address 1 field to an Address 4 field included in a corresponding MAC frame header. In the case of the control frame, both the To DS subfield and the From DS subfield are set to "0." In the case of the management frame, the To DS subfield and the From DS subfield may be sequentially set to "1" and "0" if a corresponding frame is a QoS management frame (QMF) and may be sequentially set to "0" and "0" if a corresponding frame is not a QMF.

The More Fragments subfield may indicate whether a fragment to be transmitted after a corresponding MAC frame is present or not. The More Fragments subfield may be set to "1" if another fragment of a current MSDU or MMPDU is present and may be set to "0" if another fragment of a current MSDU or MMPDU is not present.

The Retry subfield may indicate whether the transmission of a corresponding MAC frame is based on the retransmission of a previous MAC frame. The Retry subfield may be set to "1" if the transmission of a corresponding MAC frame is based on the retransmission of a previous MAC frame and may be set to "0" if the transmission of a corresponding MAC frame is not based on the retransmission of a previous MAC frame.

The Power Management subfield may indicate power management mode of an STA. The Power Management subfield may indicate that an STA switches to power saving mode if the Power Management subfield value is "1."

The More Data subfield may indicate whether a MAC frame to be additionally transmitted is present or not. The More Data subfield may be set to "1" if a MAC frame to be additionally transmitted is present and may be set to "0" if a MAC frame to be additionally transmitted is not present.

The Protected Frame subfield may indicate whether a Frame Body field has been encrypted. The Protected Frame subfield may be set to "1" if the Frame Body field includes information processed by a cryptographic encapsulation algorithm and may be set to "0" if the Frame Body field does not include information processed by a cryptographic encapsulation algorithm.

The pieces of information included in each of the aforementioned fields may comply with the definition of the IEEE 802.11 system. Furthermore, the aforementioned fields correspond to an example of fields which may be included in a MAC frame, but the present invention is not limited thereto. That is, each of the aforementioned fields may be replaced with another field or an additional field may be further included and all of the fields may not be essentially included.

FIG. 8 illustrates a VHT format of an HT Control field in a wireless communication system to which an embodiment of the present invention may be applied.

Referring to FIG. 8, the HT Control field may include a VHT subfield, an HT control middle subfield, an AC constraint subfield, and a reverse direction grant (RDG)/more PPDU subfield.

The VHT subfield indicates whether the HT Control field has the format of an HT Control field for VHT (VHT=1) or has the format of an HT Control field for HT (VHT=0). In FIG. 8, it is assumed that the HT Control field is an HT Control field for VHT (i.e., VHT=1). The HT Control field for VHT may be called a VHT Control field.

The HT control middle subfield may be implemented to a different format depending on the indication of a VHT subfield. The HT control middle subfield is described in detail later.

The AC constraint subfield indicates whether the mapped access category (AC) of a reverse direction (RD) data frame is constrained to a single AC.

The RDG/more PPDU subfield may be differently interpreted depending on whether a corresponding field is transmitted by an RD initiator or an RD responder.

Assuming that a corresponding field is transmitted by an RD initiator, the RDG/more PPDU subfield is set to "1" if an RDG is present, and the RDG/more PPDU subfield is set to "0" if an RDG is not present. Assuming that a corresponding field is transmitted by an RD responder, the RDG/more PPDU subfield is set to "1" if a PPDU including the corresponding subfield is the last frame transmitted by the RD responder, and the RDG/more PPDU subfield is set to "0" if another PPDU is transmitted.

As described above, the HT control middle subfield may be implemented to a different format depending on the indication of a VHT subfield.

The HT control middle subfield of an HT Control field for VHT may include a reserved bit subfield, a modulation and coding scheme (MCS) feedback request (MRQ) subfield, an MRQ sequence identifier (MSI)/space-time block coding (STBC) subfield, an MCS feedback sequence identifier (MFSI)/least significant bit (LSB) of group ID (GID-L) subfield, an MCS feedback (MFB) subfield, a most significant Bit (MSB) of group ID (GID-H) subfield, a coding type subfield, a feedback transmission type (FB Tx type) subfield, and an unsolicited MFB subfield.

Furthermore, the MFB subfield may include the number of VHT space time streams (NUM_STS) subfield, a VHT-MCS subfield, a bandwidth (BW) subfield, and a signal to noise ratio (SNR) subfield.

The NUM_STS subfield indicates the number of recommended spatial streams. The VHT-MCS subfield indicates a recommended MCS. The BW subfield indicates bandwidth information related to a recommended MCS. The SNR subfield indicates an average SNR value of data subcarriers and spatial streams.

The information included in each of the aforementioned fields may comply with the definition of an IEEE 802.11 system. Furthermore, each of the aforementioned fields corresponds to an example of fields which may be included in a MAC frame and is not limited thereto. That is, each of the aforementioned fields may be substituted with another field, additional fields may be further included, and all of the fields may not be essentially included.

Medium Access Mechanism

In IEEE 802.11, communication is basically different from that of a wired channel environment because it is performed in a shared wireless medium.

In a wired channel environment, communication is possible based on carrier sense multiple access/collision detection (CSMA/CD). For example, when a signal is once transmitted by a transmission stage, it is transmitted up to a reception stage without experiencing great signal attenuation because there is no great change in a channel environment. In this case, when a collision between two or more signals is detected, detection is possible. The reason for this is that power detected by the reception stage becomes instantly higher than power transmitted by the transmission stage. In a radio channel environment, however, since various factors (e.g., signal attenuation is great depending on the distance or instant deep fading may be generated) affect a channel, a transmission stage is unable to accurately perform carrier sensing regarding whether a signal has been correctly transmitted by a reception stage or a collision has been generated.

Accordingly, in a WLAN system according to IEEE 802.11, a carrier sense multiple access with collision avoidance (CSMA/CA) mechanism has been introduced as the basic access mechanism of MAC. The CAMA/CA mechanism is also called a distributed coordination function (DCF) of IEEE 802.11 MAC, and basically adopts a "listen before talk" access mechanism. In accordance with such a type of access mechanism, an AP and/or an STA perform clear channel assessment (CCA) for sensing a radio channel or a medium for a specific time interval (e.g., a DCF inter-frame space (DIFS)) prior to transmission. If, as a result of the sensing, the medium is determined to be an idle state, the AP and/or the STA starts to transmit a frame through the corresponding medium. In contrast, if, as a result of the sensing, the medium is determined to be a busy state (or an occupied status), the AP and/or the STA do not start their transmission, may wait for a delay time (e.g., a random backoff period) for medium access in addition to the DIFS assuming that several STAs already wait for in order to use the corresponding medium, and may then attempt frame transmission.

Assuming that several STAs trying to transmit frames are present, they will wait for different times because the STAs stochastically have different backoff period values and will attempt frame transmission. In this case, a collision can be minimized by applying the random backoff period.

Furthermore, the IEEE 802.11 MAC protocol provides a hybrid coordination function (HCF). The HCF is based on a DCF and a point coordination function (PCF). The PCF is a polling-based synchronous access method, and refers to a method for periodically performing polling so that all of receiving APs and/or STAs can receive a data frame. Furthermore, the HCF has enhanced distributed channel access (EDCA) and HCF controlled channel access (HCCA). In EDCA, a provider performs an access method for providing a data frame to multiple users on a contention basis. In HCCA, a non-contention-based channel access method using a polling mechanism is used. Furthermore, the HCF includes a medium access mechanism for improving the quality of service (QoS) of a WLAN, and may transmit QoS data in both a contention period (CP) and a contention-free period (CFP).

FIG. 9 is a diagram illustrating a random backoff period and a frame transmission procedure in a wireless communication system to which an embodiment of the present invention may be applied.

When a specific medium switches from an occupied (or busy) state to an idle state, several STAs may attempt to transmit data (or frames). In this case, as a scheme for minimizing a collision, each of the STAs may select a random backoff count, may wait for a slot time corresponding to the selected random backoff count, and may attempt transmission. The random backoff count has a pseudo-random integer value and may be determined as one of uniformly distributed values in 0 to a contention window (CW) range. In this case, the CW is a CW parameter value. In the CW parameter, CW_min is given as an initial value. If transmission fails (e.g., if ACK for a transmitted frame is not received), the CW_min may have a twice value. If the CW parameter becomes CW_max, it may maintain the CW_max value until data transmission is successful, and the data transmission may be attempted. If the data transmission is successful, the CW parameter is reset to a CW_min value. The CW, CW_min, and CW_max values may be set to $2^n-1$ (n=0, 1, 2, . . . ).

When a random backoff process starts, an STA counts down a backoff slot based on a determined backoff count value and continues to monitor a medium during the countdown. When the medium is monitored as a busy state, the STA stops the countdown and waits. When the medium becomes an idle state, the STA resumes the countdown.

In the example of FIG. 9, when a packet to be transmitted in the MAC of an STA 3 is reached, the STA 3 may check that a medium is an idle state by a DIFS and may immediately transmit a frame.

The remaining STAs monitor that the medium is the busy state and wait. In the meantime, data to be transmitted by each of an STA 1, an STA 2, and an STA 5 may be generated. When the medium is monitored as an idle state, each of the STAs waits for a DIFS and counts down a backoff slot based on each selected random backoff count value.

The example of FIG. 9 shows that the STA 2 has selected the smallest backoff count value and the STA 1 has selected the greatest backoff count value. That is, FIG. 7 illustrates that the remaining backoff time of the STA 5 is shorter than remaining backoff time of the STA 1 at a point of time at which the STA 2 finishes a backoff count and starts frame transmission.

The STA 1 and the STA 5 stop countdown and wait while the STA 2 occupies the medium. When the occupation of the medium by the STA is finished and the medium becomes an idle state again, each of the STA 1 and the STA 5 waits for a DIFS and resumes the stopped backoff count. That is, each of the STA 1 and the STA 5 may start frame transmission after counting down the remaining backoff slot corresponding to the remaining backoff time. The STA 5 starts frame transmission because the STA 5 has a shorter remaining backoff time than STA 1.

While the STA 2 occupies the medium, data to be transmitted by an STA 4 may be generated. In this case, from a standpoint of the STA 4, when the medium becomes an idle state, the STA 4 waits for a DIFS and counts down a backoff slot corresponding to its selected random backoff count value.

FIG. 9 shows an example in which the remaining backoff time of the STA 5 coincides with the random backoff count value of the STA 4. In this case, a collision may be generated between the STA 4 and the STA 5. When a collision is generated, both the STA 4 and the STA 5 do not receive ACK, so data transmission fails. In this case, each of the STA 4 and the STA 5 doubles its CW value, select a random backoff count value, and counts down a backoff slot.

The STA 1 waits while the medium is the busy state due to the transmission of the STA 4 and the STA 5. When the medium becomes an idle state, the STA 1 may wait for a DIFS and start frame transmission after the remaining backoff time elapses.

The CSMA/CA mechanism includes virtual carrier sensing in addition to physical carrier sensing in which an AP and/or an STA directly sense a medium.

Virtual carrier sensing is for supplementing a problem which may be generated in terms of medium access, such as a hidden node problem. For the virtual carrier sensing, the MAC layer of a WLAN system uses a network allocation vector (NAV). The NAV is a value indicated by an AP and/or an STA which now uses a medium or has the right to use the medium in order to notify another AP and/or STA of the remaining time until the medium becomes an available state. Accordingly, a value set as the NAV corresponds to the period in which a medium is reserved to be used by an AP and/or an STA that transmit corresponding frames. An STA that receives an NAV value is prohibited from accessing the medium during the corresponding period. The NAV may be set based on the value of the Duration field of the MAC header of a frame, for example.

An AP and/or an STA may perform a procedure for exchanging a request to send (RTS) frame and a clear to send (CTS) frame in order to provide notification that they will access a medium. The RTS frame and the CTS frame include information indicating a temporal section in which a wireless medium required to transmit/receive an ACK frame has been reserved to be accessed if substantial data frame transmission and an acknowledgement response (ACK) are supported. Another STA which has received an RTS frame from an AP and/or an STA attempting to send a frame or which has received a CTS frame transmitted by an STA to which a frame will be transmitted may be configured to not access a medium during a temporal section indicated by information included in the RTS/CTS frame. This may be implemented by setting the NAV during a time interval.

Interframe Space (IFS)

A time interval between frames is defined as an interframe space (IFS). An STA may determine whether a channel is used during an IFS time interval through carrier sensing. In an 802.11 WLAN system, a plurality of IFSs is defined in order to provide a priority level by which a wireless medium is occupied.

FIG. 10 is a diagram illustrating an IFS relation in a wireless communication system to which an embodiment of the present invention may be applied.

All of pieces of timing may be determined with reference to physical layer interface primitives, that is, a PHY-TX-END.confirm primitive, a PHYTXSTART.confirm primitive, a PHY-RXSTART.indication primitive, and a PHY-RXEND.indication primitive.

An interframe space (IFS) depending on an IFS type is as follows.

a) A reduced interframe space (IFS) (RIFS)
b) A short interframe space (IFS) (SIFS)
c) A PCF interframe space (IFS) (PIFS)
d) A DCF interframe space (IFS) (DIFS)
e) An arbitration interframe space (IFS) (AIFS)
f) An extended interframe space (IFS) (EIFS)

Different IFSs are determined based on attributes specified by the PHY layer regardless of the bit rate of an STA.

IFS timing is defined as a time gap on a medium. IFS timing other than the AIFS is fixed for each physical layer.

The SIFS is used to transmits a PPDU including an ACK frame, a CTS frame, a Block ACK Request (BlockAckReq) frame, or a block ACK (BlockAck) frame, that is, an instant response to an A-MPDU, the second or consecutive MPDU of a fragment burst, and a response from an STA with respect to polling according to a PCF. The SIFS has the highest priority. Furthermore, the SIFS may be used for the point coordinator of frames regardless of the type of frame during a non-contention period (CFP) time. The SIFS indicates the time prior to the start of the first symbol of the preamble of a next frame which is subsequent to the end of the last symbol of a previous frame or from signal extension (if present).

SIFS timing is achieved when the transmission of consecutive frames is started in a Tx SIFS slot boundary.

The SIFS is the shortest in IFS between transmissions from different STAs. The SIFS may be used if an STA occupying a medium needs to maintain the occupation of the medium during the period in which the frame exchange sequence is performed.

Other STAs required to wait so that a medium becomes an idle state for a longer gap can be prevented from attempting to use the medium because the smallest gap between transmissions within a frame exchange sequence is used. Accordingly, priority may be assigned in completing a frame exchange sequence that is in progress.

The PIFS is used to obtain priority in accessing a medium. The PIFS may be used in the following cases.

An STA operating under a PCF

An STA sending a channel switch announcement frame

An STA sending a traffic indication map (TIM) frame

A hybrid coordinator (HC) starting a CFP or transmission opportunity (TXOP)

An HC or non-AP QoS STA, that is, a TXOP holder polled for recovering from the absence of expected reception within a controlled access phase (CAP)

An HT STA using dual CTS protection before sending CTS2

A TXOP holder for continuous transmission after a transmission failure

A reverse direction (RD) initiator for continuous transmission using error recovery An HT AP during a PSMP sequence in which a power save multi-poll (PSMP) recovery frame is transmitted An HT AT performing CCA within a secondary channel before sending a 40 MHz mask PPDU using EDCA channel access In the illustrated examples, an STA using the PIFS starts transmission after a carrier sense (CS) mechanism for determining that a medium is an idle state in a Tx PIFS slot boundary other than case where CCA is performed in a secondary channel.

The DIFS may be used by an STA which operates to send a data frame (MPDU) and a MAC management protocol data unit management (MMPDU) frame under the DCF. An STA using the DCF may transmit data in a TxDIFS slot boundary if a medium is determined to be an idle state through a carrier sense (CS) mechanism after an accurately received frame and a backoff time expire. In this case, the accurately received frame means a frame indicating that the PHY-RXEND.indication primitive does not indicate an error and an FCS indicates that the frame is not an error (i.e., error free).

An SIFS time ("aSIFSTime") and a slot time ("aSlotTime") may be determined for each physical layer. The SIFS time has a fixed value, but the slot time may be dynamically changed depending on a change in the wireless delay time "aAirPropagationTime."

Block ACK Procedure

FIG. 11 is a diagram illustrating a DL MU-MIMO transmission process in a wireless communication system to which an embodiment of the present invention may be applied.

In 802.11ac, MU-MIMO is defined in downlink from an AP to a client (i.e., a non-AP STA). In this case, a multi-user (MU) frame is transmitted to multiple recipients at the same time, but acknowledgement (ACK) needs to be individually transmitted in uplink.

All of MPDUs transmitted within a VHT MU PPDU based on 802.11ac are included in an A-MPDU. Accordingly, a response to the A-MPDU within the VHT MU PPDU other than an immediate response to the VHT MU PPDU is transmitted in response to a block ACK request (BAR) frame by the AP.

First, an AP sends a VHT MU PPDU (i.e., a preamble and data) to all of recipients (i.e., an STA 1, an STA 2, and an STA 3). The VHT MU PPDU includes a VHT A-MPDU transmitted to each of the STAs.

The STA 1 that has received the VHT MU PPDU from the AP sends a block acknowledgement (BA) frame to the AP after an SIFS. The BA frame is described later in detail.

The AP that has received the BA from the STA 1 sends a block acknowledgement request (BAR) frame to the STA 2 after an SIFS. The STA 2 sends a BA frame to the AP after an SIFS. The AP that has received the BA frame from the STA 2 sends a BAR frame to the STA 3 after an SIFS. The STA 3 sends a BA frame to the AP after an SIFS.

When such a process is performed by all of the STAs, the AP sends a next MU PPDU to all of the STAs.

High Efficiency (HE, 802.11Ax) System

Hereinafter, a next-generation WLAN system is described. The next-generation WLAN system is a next-generation WI-FI system and, for example, IEEE 802.11ax may be described as an embodiment of such a next-generation WI-FI system. In this specification, the following next-generation WLAN system is called a high efficiency (HE) system, and the frame, PPDU, etc. of the system may be called a HE frame, a HE PPDU, a HE preamble, a HE-SIG field, a HE-STF, a HE-LTF, and so on.

The description for the existing WLAN system, such as the above-described VHT system, can be applied to contents not further described below with respect to the HE system. For example, explanations for the VHT-SIG A field, VHT-STF, VHT-LTF and VHT-SIG-B can be applied for the HE-SIG A field, HE-STF, HE-LTF and HE-SIG-B. The HE frame and the preamble of the proposed HE system can be used for other wireless communication or cellular systems as well. The HE STA may be a non-AP STA or an AP STA as described above. The STA device may also refer to a HE STA device, although it will be referred to as STA in the following specification.

FIG. 12 is a diagram illustrating a high efficiency (HE) format PPDU according to an embodiment of the present invention.

FIG. 12(a) illustrates a schematic configuration of the HE format PPDU, and FIGS. 12(b) to 12(d) illustrate more detailed configurations of the HE format PPDU.

Referring to FIG. 12(a), the HE format PPDU for a HEW may basically include a legacy part (L-part), a HE-part, and a HE-data field.

The L-part includes an L-STF, an L-LTF, and an L-SIG field as in a form maintained in the existing WLAN system. The L-STF, the L-LTF, and the L-SIG field may be called a legacy preamble.

The HE-part is a part newly defined for the 802.11ax standard and may include a HE-STF, a HE-SIG field, and a HE-LTF. In FIG. 12(a), the sequence of the HE-STF, the HE-SIG field, and the HE-LTF is illustrated, but the HE-STF, the HE-SIG field, and the HE-LTF may be configured in a different sequence. Furthermore, the HE-LTF may be omitted. Not only the HE-STF and the HE-LTF, but the HE-SIG field may be commonly called a HE-preamble.

Furthermore, the L-part, HE-SIG field and HE-preamble may be collectively called a physical (PHY) preamble/physical preamble.

The HE-SIG field may include information (e.g., OFDMA, UL MU MIMO and/or improved MCS) for decoding the HE-data field.

The L-part and the HE-part may have different Fast Fourier transform (FFT) sizes (i.e., different subcarrier spacing) and use different cyclic prefixes (CPs).

In an 802.11ax system, an FFT size four times (4×) larger than that of a legacy WLAN system may be used. That is, the L-part may have a 1× symbol structure, and the HE-part (more specifically, HE-preamble and HE-data) may have a 4× symbol structure. In this case, FFT of a 1×, 2×, or 4× size indicates a relative size for a legacy WLAN system (e.g., IEEE 802.11a, 802.11n, and 802.11ac).

For example, if the sizes of FFT used in the L-part are 64, 128, 256, and 512 in 20 MHz, 40 MHz, 80 MHz, and 200 MHz, respectively, the sizes of FFTs used in the HE-part may be 256, 512, 1024, and 2048 in 20 MHz, 40 MHz, 80 MHz, and 200 MHz, respectively.

When an FFT size becomes larger than that of a legacy WLAN system as described above, subcarrier frequency spacing is reduced. Accordingly, the number of subcarriers per unit frequency is increased, but the length of an OFDM symbol is increased.

That is, if a larger FFT size is used, it means that subcarrier spacing is narrowed. Likewise, it means that an inverse discrete Fourier transform (IDFT)/discrete Fourier transform (DFT) period is increased. In this case, the IDFT/DFT period may mean a symbol length other than a guard interval (GI) in an OFDM symbol.

Accordingly, if an FFT size four times larger than that of the L-part is used in the HE-part (more specifically, the HE-preamble and the HE-data field), the subcarrier spacing of the HE-part becomes ¼ times the subcarrier spacing of the L-part, and the IDFT/DFT period of the HE-part is four times the IDFT/DFT period of the L-part. For example, if the subcarrier spacing of the L-part is 312.5 kHz (=20 MHz/64, 40 MHz/128, 80 MHz/256 and/or 200 MHz/512), the subcarrier spacing of the HE-part may be 78.125 kHz (=20 MHz/256, 40 MHz/512, 80 MHz/1024 and/or 200 MHz/2048). Furthermore, if the IDFT/DFT period of the L-part is 3.2 μs (=1/312.5 kHz), the IDFT/DFT period of the HE-part may be 12.8 μs (=1/78.125 kHz).

In this case, since one of 0.8 μs, 1.6 μs, and 3.2 μs may be used as a GI, the OFDM symbol length (or symbol interval) of the HE-part including the GI may be 13.6 μs, 14.4 μs, or 20 μs depending on the GI.

Referring to FIG. 12(b), the HE-SIG field may be divided into a HE-SIG-A field and a HE-SIG-B field.

For example, the HE-part of the HE format PPDU may include a HE-SIG-A field having a length of 12.8 μs, a HE-STF of 1 OFDM symbol, one or more HE-LTFs, and a HE-SIG-B field of 1 OFDM symbol.

Furthermore, in the HE-part, an FFT size four times greater than that of the existing PPDU may be applied from the HE-STF other than the HE-SIG-A field. That is, FFTs having 256, 512, 1024, and 2048 sizes may be applied from the HE-STFs of the HE format PPDUs of 20 MHz, 40 MHz, 80 MHz, and 200 MHz, respectively.

In this case, if the HE-SIG field is divided into the HE-SIG-A field and the HE-SIG-B field as in FIG. 12(b), the positions of the HE-SIG-A field and the HE-SIG-B field may be different from those of FIG. 12(b). For example, the HE-SIG-B field may be transmitted after the HE-SIG-A field, and the HE-STF and the HE-LTF may be transmitted after the HE-SIG-B field. In this case, an FFT size four times larger than that of the existing PPDU may be applied from the HE-STF.

Referring to FIG. 12(c), the HE-SIG field may not be divided into a HE-SIG-A field and a HE-SIG-B field.

For example, the HE-part of the HE format PPDU may include a HE-STF of 1 OFDM symbol, a HE-SIG field of 1 OFDM symbol, and one or more HE-LTFs.

In the manner similar to that described above, an FFT size four times larger than that of the existing PPDU may be applied to the HE-part. That is, FFT sizes of 256, 512, 1024, and 2048 may be applied from the HE-STF of the HE format PPDU of 20 MHz, 40 MHz, 80 MHz, and 200 MHz, respectively.

Referring to FIG. 12(d), the HE-SIG field is not divided into a HE-SIG-A field and a HE-SIG-B field, and the HE-LTF may be omitted.

For example, the HE-part of the HE format PPDU may include a HE-STF of 1 OFDM symbol and a HE-SIG field of 1 OFDM symbol.

In the manner similar to that described above, an FFT size four times larger than that of the existing PPDU may be applied to the HE-part. That is, the FFT sizes of 256, 512, 1024, and 2048 may be applied from the HE-STFs of the HE format PPDU of 20 MHz, 40 MHz, 80 MHz, and 200 MHz, respectively.

The HE format PPDU for a WLAN system according to an embodiment of the present invention may be transmitted through at least one 20 MHz channel. For example, the HE format PPDU may be transmitted in a 40 MHz, 80 MHz or 200 MHz frequency band through a total of four 20 MHz channels. This is described in more detail.

FIG. 13 is a diagram illustrating a HE format PPDU according to an embodiment of the present invention.

FIG. 13 illustrates a PPDU format if an 80 MHz frequency band has been allocated to one STA (or if an OFDMA resource unit has been allocated to a plurality of STAs within an 80 MHz frequency band) or if different streams each having an 80 MHz frequency band have been allocated to a plurality of STAs.

Referring to FIG. 13, an L-STF, an L-LTF, and an L-SIG field may be transmitted in an OFDM symbol generated based on 64 FFT points (or 64 subcarriers) in each 20 MHz channel.

A HE-SIG A field may include common control information in common transmitted to STAs that receive a PPDU. The HE-SIG A field may be transmitted in one to three OFDM symbols. The HE-SIG A field may be duplicated in a 20 MHz unit and includes the same information. Furthermore, the HE-SIG-A field provides notification of information about the full bandwidth of a system.

Information, such as Table 1 below, may be included in the HE-SIG A field.

TABLE 1

| FIELD | BIT | DESCRIPTION |
| --- | --- | --- |
| Bandwidth | 2 | Indicates a bandwidth in which a PPDU is transmitted. For example, 20 MHz, 40 MHz, 80 MHz or 200 MHz |
| Group ID | 6 | Indicates an STA or a group of STAs that will receive a PPDU |
| Stream information | 12 | Indicate the position or number of spatial streams for each STA or indicate the position or number of spatial streams for a group of STAs |
| UL indication | 1 | Indicate whether a PPDU is directed toward an AP (uplink) or an STA (downlink) |
| MU indication | 1 | Indicate whether a PPDU is an SU-MIMO PPDU or an MU-MIMO PPDU |
| GI indication | 1 | Indicate whether a short GI or a long GI is used |
| Allocation information | 12 | Indicate a band or channel (a subchannel index or subband index) allocated to each STA in a band in which a PPDU is transmitted |
| Transmission power | 12 | Indicate transmission power for each channel or each STA |

Pieces of information included in each of the fields illustrated in Table 1 may comply with the definition of the IEEE 802.11 system. Furthermore, each of the aforementioned fields corresponds to an example of fields which may be included in a PPDU, but is not limited thereto. That is, each of the aforementioned fields may be replaced with another field or an additional field may be further included and all of the fields may not be essentially included.

The HE-STF is used to improve performance of automatic gain control (AGC) estimation in MIMO transmission. The HE-STF may be generated using the sequence of a frequency domain for a specific band. A HE-long training field (HE-LTF) is a field which is used to estimate a MIMO channel between reception chains in a receiver and a set of constellation mapper outputs.

The HE-SIG-B field may contain user-specific information required for each STA to receive its data (e.g., PSDU). The HE-SIG-B field may be transmitted in one or two OFDM symbols. For example, the HE-SIG-B field may contain information about the modulation and coding scheme (MCS) of the PSDU and the length of the PSDU.

The L-STF, L-LTF, the L-SIG field, and the HE-SIG A field may be repeated in a 20 MHz channel unit and transmitted. For example, when a PPDU is transmitted through four 20 MHz channels (i.e., 80 MHz bands), the L-STF, the L-LTF, the L-SIG field, and the HE-SIG A field may be repeated every 20 MHz channel and transmitted.

If the size of FFT increases, a legacy STA supporting the existing IEEE 802.11a/g/n/ac may not decode a corresponding HE PPDU. In order for a legacy STA and a HE STA to coexist, the L-STF, L-LTF, and the L-SIG field are transmitted through 64 FFT in a 20 MHz channel so that a legacy STA can receive them. For example, the L-SIG field may occupy one OFDM symbol, and one OFDM symbol time may be 4 μs, and a GI may be 0.8 μs.

The size of FFT for each frequency unit may be further increased from the HE-STF (or the HE-SIG A field). For example, 256 FFT may be used in a 20 MHz channel, 512 FFT may be used in a 40 MHz channel, and 1024 FFT may be used in an 80 MHz channel. If the size of FFT increases, the number of OFDM subcarriers per unit frequency increases because spacing between the OFDM subcarriers is reduced, but the OFDM symbol time/duration is increased. In order to improve efficiency of a system, the length of a GI after the HE-STF may be set to be the same as that of the HE-SIG A field.

The HE-SIG A field may include information which is required for a HE STA to decode a HE PPDU. However, the HE-SIG A field may be transmitted through 64 FFT in a 20 MHz channel so that both a legacy STA and a HE STA can receive the HE-SIG A field. The reason for this is that the HE STA has to receive an existing HT/VHT format PPDU in addition to a HE format PPDU and a legacy STA and the HE STA have to distinguish the HT/VHT format PPDU from the HE format PPDU.

FIG. 14 is a diagram illustrating a HE format PPDU according to an embodiment of the present invention.

In FIG. 14, it is assumed that 20 MHz channels are allocated to different STAs (e.g., an STA 1, an STA 2, an STA 3, and an STA 4).

Referring to FIG. 14, in this case, the size of FFT per unit frequency may be further increased after a HE-STF (or the HE-SIG B field). For example, 256 FFT may be used in a 20 MHz channel, 512 FFT may be used in a 40 MHz channel, and 1024 FFT may be used in an 80 MHz channel from the HE-STF (or the HE-SIG B field).

Information transmitted in each of the fields included in the HE format PPDU is the same as that of FIG. 13, and a description thereof is omitted.

The HE-SIG B field may include information specified for each of the STAs, but may be encoded in a full band (i.e., indicated in the HE-SIG-A field). That is, the HE-SIG B field includes information about all of the STAs and may be transmitted so that it is received by all of the STAs.

The HE-SIG B field may provide notification of information about a frequency bandwidth allocated to each of the STAs and/or stream information in a corresponding frequency band. For example, in the HE-SIG-B field of FIG. 14, a 20 MHz frequency band may be allocated to the STA 1, a next 20 MHz frequency band may be allocated to the STA 2, a next 20 MHz frequency band may be allocated to the STA 3, and a next 20 MHz frequency band may be allocated to the STA 4. Furthermore, a 40 MHz frequency band may be allocated to the STA 1 and the STA 2, and a next 40 MHz frequency band may be allocated to the STA 3 and the STA 4. In this case, different streams may be allocated to the STA 1 and the STA 2, and different streams may be allocated to the STA 3 and the STA 4.

Furthermore, a HE-SIG-C field may be defined and added to the example of FIG. 14. In this case, in the HE-SIG-B field, information about all of the STAs may be transmitted in a full band, and control information specific to each of the STAs may be transmitted in a 20 MHz unit through the HE-SIG-C field. In this case, the HE-SIG-C field may be transmitted after the HE-LTF field.

Furthermore, in the examples of FIGS. 13 and 14, the HE-SIG-B field is not transmitted in a full band, but may be transmitted in a 20 MHz unit like the HE-SIG-A field. This is described below with reference to related drawings.

FIG. 15 is a diagram illustrating a HE format PPDU according to an embodiment of the present invention.

In FIG. 15, it is assumed that 20 MHz channels are allocated to different STAs (e.g., STA 1, STA 2, STA 3, and STA 4).

Referring to FIG. 15, the HE-SIG-B field is not transmitted over an entire band but transmitted in a unit of 20 MHz, as in the HE-SIG-A field. However, in this case, the HE-SIG-B is encoded in a unit of 20 MHz and transmitted, unlike the HE-SIG-A field, but the HE-SIG-B may not be duplicated in a unit of 20 MHz and transmitted.

In this case, the FFT size per unit frequency may further increase from a HE-STF (or HE-SIG B). For example, from the HE-STF (or the HE-SIG B), 256 FFT may be used in a 20 MHz channel, 512 FFT may be used in a 40 MHz channel, and 1024 FFT may be used in an 80 MHz channel.

Information transmitted from each field included in the PPDU is the same as that of an illustration of FIG. 13, and therefore a description thereof is omitted.

The HE-SIG-A field is duplicated in a unit of 20 MHz and transmitted.

The HE-SIG B field may provide notification of information about an allocated frequency bandwidth and/or stream information in a corresponding frequency band on a STA basis. The HE-SIG-B field includes information about each STA and information about each STA may be included in each HE-SIG-B field of a 20 MHz unit. In this case, FIG. 15 illustrates a case in which 20 MHz is assigned on each STA basis, but for example, when 40 MHz is assigned to the STA, the HE-SIG-B field may be duplicated and transmitted in a unit of 20 MHz.

In a situation of supporting different bandwidths on each BSS basis, when allocating some bandwidths having a small interference level from an adjacent BSS to the STA, as described above, it may be preferable not to transmit the HE-SIG-B field over an entire band.

In FIGS. 13 to 15, the data field is a payload and may include a service field, a scrambled PSDU, tail bits, and padding bits.

A HE format PPDU of FIGS. 13 to 15 may be classified by s repeated L-SIG (RL-SIG) field, which is a repetition symbol of an L-SIG field. The RL-SIG field is inserted in front of the HE SIG-A field, and each STA may classify a format of the PPDU received using the RL-SIG field as the HE format PPDU.

FIG. 16 is a diagram illustrating a HE frame structure according to an embodiment of the present invention.

As described above, in the 802.11ax system, for the purpose of average throughput enhancement and robust transmission outdoors, a symbol length four times longer than that in the legacy 802.11 systems (e.g., 802.11a, 802.11n and 802.11ac) is to be used. An STA may adopt an FFT size that is four times great when performing OFDM modulation.

FIG. 16 shows the structure of a HE signal frame according to an embodiment. In FIG. 16, duration whose symbol length is four times long is indicated as a 4-times (4×) FFT size. As in FIG. 16, in the signal frame, an L-part, that is, a legacy preamble, may use the same FFT size (1×) as that of the legacy system. In a HE part, the 1×FFT size may be applied up to a HE-SIG field, and the 4×FFT size may be applied to a HE-STF, HE-LTF and HE-data part. In this case, the embodiment of FIG. 16 may be combined with the embodiments of FIGS. 12 to 15.

When the FFT size increases, throughput can be improved because the number of subcarriers of a transmission signal is increased compared to the 802.11 legacy system signal, but the time taken to process data may be increased because symbol duration is increased in a receiver. Accordingly, if a predefined SIFS time is used without any change, a reception STA may not send an ACK frame after a determined SIFS time.

An STA needs to send an ACK frame or CTS frame for a signal frame received after an SIFS time. The SIFS time (SIFSTime) is as follows.

SIFSTime=aRxPHYDelay+aMACPRocessingDelay+ aTxPHYDelay+aRxTxSwitchTime+aTxRampOnTime A brief description of the times included in the SIFS time is as follows.

aRxPHYDelay: a nominal time (in microseconds) that is taken for the PHY layer to deliver the last bit of a received frame from the end of the last symbol at the air interface to the MAC.

aMACProcessingDelay: a maximum time taken for the MAC layer to issue the indication of the start of transmission, the indication of the end of reception, and the indication of CCA to the PHY layer. That is, a maximum time (in microseconds) available for the MAC layer to issue a PHY-TXSTART.request primitive pursuant to a PHY-RX-END.indication primitive (for a response after SIFS) or a PHY-CCA.indication(IDLE) primitive (for a response at any slot boundary following a SIFS))

aTxPHYDelay: a nominal time (in microseconds) that is taken for the PHY layer to deliver a symbol from the MAC interface to the air interface aRxTxSwitchTime: a nominal time (in microseconds) that is taken for the PHY layer to switch from reception to transmission aTxRampOnTime: a maximum time (in microseconds) that is taken for the PHY layer to turn on a transmitter As described above, as symbol duration is increased because the 4×FFT size is used, the aRxPHYDelay time is increased and thus an STA may not send an ACK frame after a determined SIFS time. Accordingly, a transmission STA may not receive an ACK frame after an SIFS time although a reception STA has well received data, and thus may determine that the reception STA has not received the data. Accordingly, a method for classifying the capabilities of a HE-STA, adding a padding symbol in association with an MCS level and data rate along with the classified capabilities, and indicating information about the padding symbol for the HE-STA is described below.

A padding symbol may be called a dummy symbol. If a transmission STA additionally generates/sends a dummy symbol, a receiver may set dummy symbol duration as a processing time additionally required for data decoding while not decoding the dummy symbol. The dummy symbol is an OFDM symbol and may be a specific signal on which OBSS STAs may determine that a channel is occupied through energy detection. Alternatively, an STA may not send any signal for specific duration of a signal frame instead of sending a dummy symbol. In this case, an additional RF or baseband chain may be necessary to generate a corresponding signal. Furthermore, since OBSS STAs may determine that a corresponding channel is idle, an embodiment in which a dummy symbol, that is, an OFDM symbol for which NAV setting can be performed up to an increasing signal processing time, is used is described below. The dummy symbol may also be called a padding symbol because it is inserted after the last data symbol. Furthermore, the dummy symbol may be also called a signal extension or an extension signal because a transmission signal is extended by the addition of the dummy symbol.

To add a dummy symbol to all of transmission signals may deteriorate system throughput. Accordingly, in an embodiment of the present invention, a dummy symbol is to be added by taking into consideration the capabilities of an STA. Accordingly, a transmission STA needs to be aware of the capabilities of a reception STA. Accordingly, a method of classifying and signaling STA capabilities is described below.

In an embodiment, the capabilities of a HE STA may be classified in an N number. The capabilities of a HE STA may be directly classified depending on decoding performance in a process of manufacturing an STA. Alternatively, the capabilities of a HE STA may be indirectly classified based on various parameters which are used for the HE STA to send and receive signals. The parameters used to classify the capabilities of the HE STA may be indicated as follows, and the capabilities may be classified through at least one of the parameters or a combination of the parameters. In an embodiment, all of such parameters may be changed, such as that some of included parameter are excluded or another parameter is included.

1) The highest data rate supported by an STA
2) A maximum payload size supported by an STA
3) The highest MCS level (or constellation level) supported by an STA
4) A maximum number of coded bits per OFDM symbol supported by an STA
5) A maximum number of data bits supported per OFDM symbol by an STA
6) A maximum number of spatial streams supported by an STA
7) A maximum number of spatial time streams supported by an STA
8) A maximum number of BCC or LDPC encoders supported by an STA
9) A maximum number of BCC or LDPC decoders supported by an STA
10) A maximum bandwidth size supported by an STA In this specification, according to an embodiment, the category of an STA may be classified into 4 categories based on the highest MCS level parameter and maximum bandwidth size parameter supported by the STA. Table 2 shows the 4 categories of an STA classified as described above.

TABLE 2

| STA category | 256QAM support (MCS-8, 9) | 160 MHz and 80 + 80 MHZ support |
|---|---|---|
| 1 | X | X |
| 2 | O | X |
| 3 | X | O |
| 4 | O | O |

The classified category information of an STA is necessary for a transmission STA to determine whether or not to add a dummy symbol and the number of dummy symbols to be padded. Accordingly, the transmission STA needs to obtain STA category information about a reception STA. Accordingly, the STA category information need to be included in signals transmitted and received between STAs and exchanged. In an embodiment of the present invention, the STA category information may be included in the HE capabilities element and delivered. In an embodiment, the HE capabilities element may be included in the beacon frame of an AP or the probe response frame, association request frame, association response frame, reassociation request frame or reassociation response frame of an STA.

FIG. 17 shows VHT capabilities elements according to an embodiment of the present invention.

In an embodiment, the HE capabilities element may be designed to have the same or similar structure as or to the VHT capabilities element. A HE STA may declare that it is a HE STA by sending the HE capabilities element. The HE capabilities element may include a HE capabilities Info field, such as that shown in FIG. 17. The embodiment of FIG. 17 has adopted a VHT capabilities Info field as an example, and information included in the VHT capabilities Info field may be changed depending on an embodiment. In FIG. 17, the last 30~31 bits of the HE capabilities Info field are reserved bits. In an embodiment of the present invention, STA category information may be transmitted using the reserved bits.

A brief description of subfields included in the HE capabilities Info field of FIG. 17 is as follows.

Maximum MPDU Length: indicates a maximum MPDU length field or a maximum MPDU length Supported Channel Width Set: indicates Supported Channel Width Set information and a channel width supported by a corresponding STA Rx LDPC: indicates received LDPC information and support for a received LDPC-encoded packet Short GI for 80 MHz: indicates short GI information for 80 MHz and whether a short GI for a received packet is supported or not Short GI for 80+80 MHz: indicates short GI information for 80+80 MHz and whether a short GI for a received packet is supported or not Tx STBC: indicates transmission STBC information and whether the transmission of at least 2×1 STBC is supported or not Rx STBC: received STBC information and whether the reception of a PPDU using STBC is supported or not SU Beamformer Capable: indicates SU beamformer capabilities information and whether an operation, such as an SU beamformer (VHT sounding protocol), is supported or not SU Beamformee Capable: indicates SU beamformee capabilities information and whether an operation, such as an SU beamformee (VHT sounding protocol), is supported or not Beamformee STS Capabilities: indicates beamformee STS capabilities information and a maximum number of spatial-time streams which may be received by an STA Number of Sounding Dimensions: indicates sounding dimension number information and the capabilities of a beamformer MU Beamformer Capable: indicates MU beamformer capabilities information and whether an operation, such as an MU beamformer (VHT sounding protocol), is supported or not MU Beamformee Capable: indicates MU beamformee capabilities information and whether an operation, such as an MU beamformee (VHT sounding protocol), is supported or not VHT(HE) TXOP PS: indicates whether an AP supports a VHT(HE) TXOP power save mode or whether the VHT(HE)-TXOP power save mode of a non-AP STA has been enabled HTC-VHT-Capable: indicates HTC-VHT(HE) capabilities information and whether an STA supports the reception of a VHT variant HT control field Maximum A-MPDU Length Exponent: indicates maximum A-MPDU length index information and a maximum length of an A-MPDU which may be received by an STA VHT(HE) Link Adaptation Capable: indicates VHT(HE) link adaptation capabilities information and whether an STA supports link adaptation using a 가 VHT variant HT control field Rx Antenna Pattern Consistency: indicates the possibility that a reception antenna pattern may be changed Tx Antenna Pattern Consistency: indicates the possibility that a transmission antenna pattern may be changed In an embodiment, an STA may use a method of separately indicating STA category information using the aforementioned reserved bits. In another embodiment, an STA may calculate an STA category using the aforementioned pieces of information about a subfield that form the HE capabilities element or VHT capabilities element without allocating additional bits. In an embodiment, an STA may obtain an STA category using at least one of pieces of information, such as the Maximum MPDU length, Supported Channel Width Set, Rx LDPC, Beamformee STS Capabilities, Number of Sounding Dimensions, Maximum A-MPDU Length Exponent, Rx MCS Map, Rx Highest Supported Long GI Data Rate, Tx MCS Map and Tx Highest Supported Long GI Data Rate, which are pieces of information included in the capabilities element. That is, the STA may obtain the STA category by receiving/obtaining signaling information about a reception STA.

When an STA category is determined, a transmission STA may pad a dummy symbol based on the category of a reception STA and the MCS level, constellation level or data rate of a data frame that is now transmitted. The MCS level (or constellation level indicates an MCS level (constellation level) that is signaled by an STA through the HE-SIG field of a physical preamble when sending data. A method for generating and adding a padding symbol is described in more detail below. Furthermore, in an embodiment, the MCS level includes a constellation level. In an embodiment of the present invention, an operation may be performed using only a constellation level in an MCS level.

(1) A Method of Configuring Bits for Configuring a Padding Symbol

Specific bit values generated without repeatedly inserting the same value by taking into consideration peak to average power ratio (PAPR) performance may be used as bits that fill a padding symbol.

a. Random bit values may be used. In an embodiment, such random bits may be generated using a PN sequence. A predefined value may be used as a seed value or some or all of an AID, Partial AID and group ID may be used as a seed value.

b. A predefined bit sequence may be used. A sequence generated/applied by taking into consideration the PAPR performance of a system may be used as the predefined bit sequence.

c. A modulation symbol may be directly generated and used instead of generating bit values in order to fill a padding symbol. Such a padding symbol may be selected as a structure in which PAPR performance is taken into consideration. In an embodiment, QPSK may be used as a modulation order.

(2) A Method of Modulating a Padding Symbol

In an embodiment, an STA may modulate a padding symbol using a modulation order which has been defined in the L-SIG or HE-SIG field or used for data transmission. In another embodiment, an STA may use a predefined modulation order regardless of a modulation order which has been defined in the L-SIG or HE-SIG field or used for data transmission.

If a predefined specific modulation order and the method (1)-b, (1)-c are used together, an OFDM symbol capable of significantly improving PAPR performance can be generated.

(3) An FFT Size and CP Length

In an embodiment, an STA may modulate a padding symbol using an FFT size and CP length which have been defined in the L-SIG or HE-SIG field or used for data transmission. In another embodiment, an STA may use a predefined FFT size and CP length regardless of an FFT size and CP length which has been defined in the L-SIG or HE-SIG field or used for data transmission.

(4) The Number of Padding Symbols a. An STA may use n padding symbols in which the FFT size of transmission data is 4× and may not generate a padding symbol if the FFT size of transmission data is 1× or 2×.

In this case, the number n of padding symbols may be determined by the aforementioned STA category. In an embodiment, the number of padding symbols of an STA category 1 may be set to 3, the number of padding symbols of an STA category 2 may be set to 2, the number of padding symbols of an STA category 3 may be set to 1, and the number of padding symbols of an STA category 4 may be set to 0. In another embodiment, the same number of padding symbols may be used with respect to some STA categories, such as that the number of padding symbols of an STA category 1 is 2, the number of padding symbols of an STA category 2 is 2, the number of padding symbols of an STA category 3 is 1, and the number of padding symbols of an STA category 4 is set to 0. Alternatively, a predefined value, such as n=1, 2, may be used regardless of STA category information.

b. An STA uses an STBC method for data transmission, may generate 2n padding symbols if the FFT size of transmission data is 4×, may generate n padding symbols if the FFT size of transmission data is 2×, and may not generate a padding symbol if the FFT size of transmission data is 1×.

In this case, the number n of padding symbols may be determined by the aforementioned STA category. In an embodiment, the number of padding symbols of an STA category 1 may be set to 3, the number of padding symbols of an STA category 2 may be set to 2, the number of padding symbols of an STA category 3 may be set to 1, and the number of padding symbols of an STA category 4 may be set to 0. In another embodiment, the same number of padding symbols may be used with respect to some STA categories, such as that the number of padding symbols of an STA category 1 is 2, the number of padding symbols of an STA category 2 is 2, the number of padding symbols of an STA category 3 is 1, and the number of padding symbols of an STA category 4 is 0. Alternatively, a predefined value, such as n=1, 2, may be used regardless of STA category information.

c. An STA uses an STBC method for data transmission, may generates 2n padding symbols if the FFT size of transmission data is 4×, and may not generate a padding symbol if the FFT size of transmission data is 2× or 1×.

In this case, the number n of padding symbols may be determined by the aforementioned STA category. In an embodiment, the number of padding symbols of an STA category 1 may be set to 3, the number of padding symbols of an STA category 2 may be set to 2, the number of padding symbols of an STA category 3 may be set to 1, and the number of padding symbols of an STA category 4 may be set to 0. In another embodiment, the same number of padding symbols may be used with respect to some STA categories, such as that the number of padding symbols of an STA category 1 is 2, the number of padding symbols of an STA category 2 is 2, the number of padding symbols of an STA category 3 is 1, and the number of padding symbols of an STA category 4 is 0. Alternatively, a predefined value, such as n=1, 2, may be used regardless of STA category information.

As described above, a transmission STA may generate a padding symbol. In this case, whether the transmission STA will insert a padding symbol or not may be determined based on the STA category of a receiver and/or the MCS level or data rate of transmission data. In other words, the transmission STA may determine whether or not to insert a padding symbol based on at least one of the category of a reception STA, the MCS level of transmission data and the data rate of the transmission data. In an embodiment, the MCS level may include 10 steps as in Table 3, but the MCS level of the 802.11ax system may further include other levels depending on an embodiment.

TABLE 3

| MCS index | Modulation | Coding Rate |
|---|---|---|
| 0 | BPSK | 1/2 |
| 1 | QPSK | 1/2 |
| 2 | QPSK | 3/4 |
| 3 | 16-QAM | 1/2 |
| 4 | 16-QAM | 3/4 |
| 5 | 64-QAM | 2/3 |
| 6 | 64-QAM | 3/4 |
| 7 | 64-QAM | 5/6 |
| 8 | 256-QAM | 3/4 |
| 9 | 256-QAM | 5/6 |

A transmission STA whether or not to add a padding symbol as in Table 4 and Table 5.

TABLE 4

| STA category | MCS index | Additional padding symbol |
|---|---|---|
| 1 | 0~2 | X |
|   | 3~9 | ○ |
| 2 | 0~4 | X |
|   | 5~9 | ○ |
| 3 | 0~7 | X |
|   | 8~9 | ○ |
| 4 | 0~9 | X |

TABLE 5

| STA category | Data rate (Mb/s) | Additional padding symbol |
|---|---|---|
| 1 | ~1200 | X |
|   | 1201~ | ○ |
| 2 | ~2400 | X |
|   | 2401~ | ○ |
| 3 | ~3600 | X |
|   | 3601~ | ○ |
| 4 | All | X |

Table 4 is an embodiment in which whether or not to add a padding symbol is determined based on an STA category and an MCS level. A transmission STA may add a padding symbol to a signal and send the signal when the MCS level is 3~9 if a reception STA is an STA category 1, when the MCS level is 5~9 if the reception STA is an STA category 2, and when the MCS level is 8~9 if the reception STA is an STA category 3.

Table 5 is an embodiment in which whether or not to add a padding symbol is determined using an STA category and a data rate. A transmission STA may add a padding symbol to a signal and send the signal when a data rate exceeds 1200 Mb/s if a reception STA is an STA category 1, when a data rate exceeds 2400 Mb/s if the reception STA is an STA category 2, and when a data rate exceeds 3600 Mb/s if the reception STA is an STA category 3.

FIG. 18 shows an STA device according to an embodiment of the present invention.

In FIG. 18, the STA device may include memory 18010, a processor 18020 and an RF unit 18030. Furthermore, as described above, the STA device is a HE STA device, and an AP or non-AP STA may become the STA device.

The RF unit 18030 is connected to the processor 18020 and may send/receive a radio signal. The RF unit 18030 may up-convert data received from the processor into a transmission/reception band, and may send a corresponding signal.

The processor 18020 is connected to the RF unit 18030 and may implement the PHY layer and/or the MAC layer according to the IEEE 802.11 system. The processor 18030 may be configured to perform operations according to various embodiments of the present invention according to the aforementioned drawing and description. Furthermore, a module for implementing the operation of an STA according to the aforementioned various embodiments of the present invention may be stored in the memory 18010 and executed by the processor 18020.

The memory 18010 is connected to the processor 18020 and stores various pieces of information for driving the processor 18020. The memory 18010 may be included within the processor 18020 or disposed outside the processor 18020 and may be connected to the processor 18020 by known means.

Furthermore, the STA device may include a single antenna or multiple antennas. A detailed configuration of the STA device of FIG. 18 may be implemented so that the contents described in the aforementioned various embodiments of the present invention are independently applied or two or more of the aforementioned various embodiments are applied to the detailed configuration as the same time.

A method for adjusting/performing CCA by the STA device of FIG. 18 and a corresponding data transmission are described along with the following flowchart.

FIG. 19 shows a method for sending, by a station (STA), data according to an embodiment of the present invention.

All of the descriptions of FIGS. 12 to 18 may be applied to FIG. 19.

An STA may generate a PPDU (S19010). The generated PPDU has the aforementioned signal frame structure and includes a physical preamble and a data field. The physical preamble may include a legacy preamble and a HE preamble. In the case of a HE PPDU, an FFT size that is four times an FFT size used in the legacy preamble may be used in the data field. Accordingly, the discrete Fourier transform/inverse discrete Fourier transform (DFT/IDFT) period of the data field may be four times the DFT/IDFT period of the legacy preamble part.

The STA may determine whether or not to add a padding symbol (S19020). As described above, the STA may determine whether or not to add a padding symbol based on at least one of information about the category of a reception STA, the MCS level of data transmitted in the PPDU, and the data rate of the data transmitted in the PPDU. The STA may receive the information about the category of the reception STA from the reception STA and may determine/obtain the information about the category of the reception STA using another piece of received information. Furthermore, as described above, the STA may determine whether or not to add a padding symbol based on a constellation level along with the MCS level or instead of the MCS level.

The STA may add the padding symbol if the addition of the padding symbol is determined (S19030). A method for generating and adding, by the STA, the padding symbol has been described in detail above. The number of added padding symbols may be determined based on the category of the reception STA. In an embodiment, the number of added padding symbols may be determined based on at least one of the MCS level, data rate and transmission bandwidth of the transmission data and the amount of the transmission data.

The added padding symbol may not be decoded by the reception STA. That is, the padding symbol may correspond to a signal extension for the transmission signal including the PPDU. The padding symbol may be added in the MAC layer or may be added in the PHY layer. In this specification, the padding symbol has been illustrated, but a padding bit may be added. That is, padding is performed for each bit with respect to specific duration of a symbol, and a symbol including a corresponding padding bit may be called a padding symbol.

Furthermore, the added padding symbol may be added after the forward error correction (FEC) coding of the data included in the PPDU. When the post-FEC padding symbol is added, a receiver can discard the padding symbol without FEC decoding, thereby increasing receiver operation efficiency. Furthermore, the STA may include signaling information about the padding symbol in the physical preamble or a MAC header and may send the physical preamble or the MAC header. Information about the location, number and duration of the padding symbol/bit may be transmitted.

The STA may send the PPDU to which the padding symbol has been added (S19040). In FIG. 19, when the PPDU is generated at step S19010, the PPDU indicates a PPDU before the padding symbol is added, and a step up to the step of adding the padding symbol may be considered to be the step of generating the PPDU. In such a case, step S19010 may be omitted or replaced with the step of generating an MPDU.

In FIG. 19, as the step of generating the PPDU, a process of processing the signal of the PHY layer has not been described. The STA device includes an FEC encoder, an interleaver, a segment parser, a mapper, an IDFT unit and an analog/RF unit. The FEC encoder, interleaver, segment parser, mapper and IDFT unit may be included in the processor of FIG. 18. The analog/RF unit may correspond to the RF unit of FIG. 18. The STA device of FIG. 18 may perform the aforementioned operations of the HE STA. This is described in brief below.

The STA may FEC-encode transmission data using the FEC encoder. In the FEC encoding, the STA may interleave the transmission data using the interleaver. The FEC encoder is kind of error correction code and may be implemented using a convolutional encoder, a turbo encoder or a low density parity check (LDPC) encoder. The FEC encoder is a convolutional encoder and may perform binary convolutional code (BCC) encoding. Furthermore, the STA may perform constellation mapping on the transmission data using the mapper. A modulation scheme in the mapper is not limited, and m-Phase shift keying (m-PSK) or m-quadrature amplitude modulation (m-QAM) may be used as the modulation scheme. Furthermore, the STA may perform IDFT or IFFT processing on the transmission data using the IDFT unit. In other words, the IDFT unit may output an OFDM symbol in a time domain by performing IFFT or IDFT on modulation symbols output by the mapper. Furthermore, the STA may up-convert the transmission data using the analog/RF unit and send the transmission signal.

In particular, in an embodiment of the present invention, the IDFT unit may apply FFT of different sizes to the first part and second part of a transmission signal. In particular, FFT that is four times that of the first part may be applied to the second part. In this case, symbol duration of the second part may be four times that of the first part. This may be indicated by a 4×IDFT/DFT period.

The analog/RF unit may up-convert a complex baseband waveform and send an RF signal. In other words, the analog/RF unit may up-convert a data/signal processed in the baseband and send a transmission signal.

Those skilled in the art will understand that the present invention may be changed or modified in various ways without departing from the spirit or range of the present invention. Accordingly, the present invention has been intended to include the changes and modifications of the present invention provided within the claims and equivalents thereof.

In this specification, both the apparatus and method inventions have been described and the descriptions of both the apparatus and method inventions may be supplemented and applied.

MODE FOR INVENTION

The various embodiments have been described in the best mode for implementing the present invention.

INDUSTRIAL APPLICABILITY

The method of transmitting and receive data in the wireless communication system of the present invention has been illustrated as being applied to the IEEE 802.11 system, but may be applied to various wireless communication systems in addition to the IEEE 802.11 system.

What is claimed is:

1. A method for transmitting data in a wireless LAN (WLAN) system, the method performed by a first station (STA) and comprising:
   receiving a high efficiency (HE) capabilities element of a second STA, the HE capabilities element comprising transmission constellation level information of the second STA;
   determining a duration of a signal extension based on both the transmission constellation level information and a transmission constellation level of a data field, the signal extension providing additional receiving processing time for the second STA;
   generating a physical protocol data unit (PPDU) comprising a physical preamble, the data field and the signal extension, the physical preamble comprising a legacy preamble part and a discrete Fourier transform/inverse discrete Fourier transform (DFT/IDFT) period of the data field being four times a DFT/IDFT period of the legacy preamble part; and
   transmitting the generated PPDU to the second STA.

2. The method of claim 1, wherein determining the duration of the signal extension based on at least one of information related to a capability of the second STA, a Modulation and Coding Scheme (MCS) level of data transmitted in the PPDU or a data rate of the data transmitted in the PPDU.

3. The method of claim 2, wherein the signal extension is not decoded in the second STA.

4. The method of claim 1, wherein the signal extension is added after forward error correction (FEC) encoding in the generated PPDU.

5. A first station (STA) device for transmitting data in a wireless LAN (WLAN) system, the device comprising:
   a radio frequency (RF) unit configured to transmit and receive radio signals; and
   a processor configured to:

control the RF unit to receive a high efficiency (HE) capabilities element of a second STA, the HE capabilities element comprising transmission constellation level information of the second STA;

determine a duration of a signal extension based on both the transmission constellation level information and a transmission constellation level of a data field, the signal extension providing additional receiving processing time for the second STA;

generate a physical protocol data unit (PPDU) comprising a physical preamble, the data field and the signal extension, the physical preamble comprising a legacy preamble part and a discrete Fourier transform/inverse discrete Fourier transform (DFT/IDFT) period of the data field being four times a DFT/IDFT period of the legacy preamble part; and control the RF unit to transmit the PPDU to the second STA.

6. The STA device of claim 5, wherein determining the duration of the signal extension is based on at least information related to a capability of the second STA a Modulation and Coding Scheme (MCS) level of data transmitted in the PPDU or a data rate of the data transmitted in the PPDU.

7. The STA device of claim 6, wherein the signal extension is not decoded in the second STA.

8. The STA device of claim 5, wherein the signal extension is added after forward error correction (FEC) encoding in the generated PPDU.

* * * * *